(12) United States Patent
Rickman et al.

(10) Patent No.: US 10,206,019 B2
(45) Date of Patent: Feb. 12, 2019

(54) OPTOELECTRONIC SWITCH

(71) Applicant: ROCKLEY PHOTONICS LIMITED, London (GB)

(72) Inventors: Andrew Rickman, Marlborough (GB); Nathan Farrington, Arcadia, CA (US); Amit Singh Nagra, Altadena, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 15/644,710

(22) Filed: Jul. 7, 2017

(65) Prior Publication Data
US 2017/0366884 A1 Dec. 21, 2017

Related U.S. Application Data

(63) Continuation of application No. 15/072,314, filed on Mar. 16, 2016, now Pat. No. 9,706,276.

(60) Provisional application No. 62/251,572, filed on Nov. 5, 2015.

(51) Int. Cl.
H04Q 11/00 (2006.01)
H04L 12/933 (2013.01)
H04J 14/02 (2006.01)
H04J 14/06 (2006.01)

(52) U.S. Cl.
CPC ..... *H04Q 11/0071* (2013.01); *H04L 49/1515* (2013.01); *H04Q 11/0005* (2013.01); *H04Q 11/0066* (2013.01); *H04Q 2011/0032* (2013.01); *H04Q 2011/0033* (2013.01)

(58) Field of Classification Search
CPC ........... H04Q 11/0071; H04Q 11/0005; H04Q 11/0066; H04Q 2011/0032

USPC .......................................... 398/43, 45, 48, 49
See application file for complete search history.

(56) References Cited

U.S. PATENT DOCUMENTS

| | | | |
|---|---|---|---|
| 6,285,809 B1 | 9/2001 | Nir et al. | |
| 6,510,260 B2 | 1/2003 | Chen et al. | |
| 6,512,612 B1 * | 1/2003 | Fatehi | H04Q 11/0005 370/401 |
| 6,529,301 B1 * | 3/2003 | Wang | H04Q 11/0005 398/82 |
| 7,088,919 B2 | 8/2006 | Graves | |
| 7,177,544 B1 | 2/2007 | Wada et al. | |
| 7,218,853 B2 | 5/2007 | Handelman | |

(Continued)

FOREIGN PATENT DOCUMENTS

| | | |
|---|---|---|
| CA | 2 386 352 A1 | 11/2003 |
| GB | 2530833 A | 4/2016 |

(Continued)

OTHER PUBLICATIONS

"2000 Networkers", Campus Switch Architecture Session 2806, Cisco Systems, Inc., 2000, 65 pages.

(Continued)

*Primary Examiner* — Oommen Jacob
(74) *Attorney, Agent, or Firm* — Lewis Roca Rothgerber Christie LLP

(57) ABSTRACT

A switch module and optoelectronic switch incorporating the same. The optoelectronic switch includes an N-dimensional array of switch modules arranged in a topology in which each switch module is a member of N sub-arrays, the sub-arrays defined with reference to the coordinates of the constituent switch modules, and wherein all of the members of each sub-array are connected by an active switch, which in some embodiments may be an optical active switch or an electronic active switch.

23 Claims, 18 Drawing Sheets

(56) References Cited

U.S. PATENT DOCUMENTS

| | | |
|---|---|---|
| 7,257,283 B1 | 8/2007 | Liu et al. |
| 7,260,329 B1 | 8/2007 | Fall et al. |
| 7,389,046 B1 | 6/2008 | Tanaka et al. |
| 7,426,210 B1 | 9/2008 | Miles et al. |
| 7,526,603 B1 | 4/2009 | Abdollahi-Alibeik et al. |
| 7,577,355 B2 * | 8/2009 | Sato .................. H04J 14/022 398/12 |
| 7,590,359 B2 * | 9/2009 | Kim .................. H04J 14/0227 398/186 |
| 7,724,759 B2 | 5/2010 | Bozso et al. |
| 7,764,882 B2 | 7/2010 | Beacken |
| 7,773,606 B2 | 8/2010 | Dobjelevski et al. |
| 7,773,608 B2 | 8/2010 | Miles et al. |
| 7,872,990 B2 | 1/2011 | Guo et al. |
| 7,899,327 B2 | 3/2011 | Wada et al. |
| 8,065,433 B2 | 11/2011 | Guo et al. |
| 8,073,327 B2 * | 12/2011 | Mayer .................. H04J 14/0227 398/43 |
| 8,098,593 B2 | 1/2012 | Guo et al. |
| 8,472,805 B2 | 6/2013 | Lam et al. |
| 8,473,659 B2 | 6/2013 | Koka et al. |
| 8,493,976 B2 | 7/2013 | Lin |
| 8,774,625 B2 | 7/2014 | Binkert et al. |
| 8,792,787 B1 | 7/2014 | Zhao et al. |
| 8,867,915 B1 | 10/2014 | Vandat et al. |
| 8,891,914 B2 | 11/2014 | Ticknor et al. |
| 8,902,751 B1 | 12/2014 | Zhou et al. |
| 8,942,559 B2 | 1/2015 | Binkert et al. |
| 9,008,510 B1 | 4/2015 | Zhao et al. |
| 9,124,383 B1 * | 9/2015 | Frankel .................. H04J 14/06 |
| 9,167,321 B2 | 10/2015 | Chen |
| 9,184,845 B1 | 11/2015 | Vandat et al. |
| 2002/0057861 A1 | 5/2002 | Ge et al. |
| 2002/0114036 A1 * | 8/2002 | Ghani .................. H04J 14/02 398/49 |
| 2002/0186432 A1 * | 12/2002 | Roorda .................. H04J 14/0204 398/82 |
| 2002/0191115 A1 * | 12/2002 | Cho .................. H04N 9/8042 348/714 |
| 2003/0138189 A1 | 7/2003 | Rockwell et al. |
| 2005/0105906 A1 | 5/2005 | Barbosa et al. |
| 2007/0009262 A1 * | 1/2007 | Perkins .................. H04J 14/0201 398/58 |
| 2009/0226183 A1 * | 9/2009 | Kang .................. G06E 3/001 398/158 |
| 2010/0254703 A1 | 10/2010 | Kirkpatrick et al. |
| 2012/0033968 A1 * | 2/2012 | Testa .................. H04J 14/0204 398/47 |
| 2012/0201540 A1 * | 8/2012 | Uekama .................. H04L 47/2441 398/54 |
| 2012/0243869 A1 * | 9/2012 | Sato .................. H04J 14/0212 398/49 |
| 2015/0249501 A1 | 9/2015 | Nagarajan |
| 2015/0309265 A1 | 10/2015 | Mehrvar et al. |
| 2017/0041691 A1 * | 2/2017 | Rickman .................. H04Q 11/0071 |

FOREIGN PATENT DOCUMENTS

| | | |
|---|---|---|
| WO | WO 2007/124514 A2 | 11/2007 |
| WO | WO 2013/063543 A1 | 5/2013 |
| WO | WO 2014/180292 A2 | 11/2014 |
| WO | WO 2015/060820 A1 | 4/2015 |

OTHER PUBLICATIONS

"66AK2E0x Multicore DSP+ARM KeyStone II System-on-Chip (SoC)", System Interconnect, Texas Instruments Incorporated, 2012-2015, pp. 1-282.

Ahn, Jung Ho et al., "HyperX: Topology, Routing, and Packaging of Efficient Large-Scale Networks", ACM, SC'09, Nov. 14-20, 2009, 11 pages, Portland, Oregon, USA.

Andreyev, Alexey, "Introducing data center fabric, the next-generation Facebook data center network", Facebook, Nov. 14, 2014, 13 pages.

Arimilli, Baba et al., "The PERCS High-Performance Interconnect", 18th IEEE Symposium on High Performance Interconnects, 2010, pp. 75-82.

Bhuyan, Laxmi N. et al., "Generalized Hypercube and Hyperbus Structures for a Computer Network", IEEE Transactions on Computers, Apr. 1984, pp. 323-333, vol. C-33, No. 4.

Dumais, Patrick et al., "Scaling up Silicon Photonic Switch Fabrics", IEEE, 2015, pp. 175-176.

Farrington, Nathan et al., "Facebook's Data Center Network Architecture", Optical Interconnects Conference, May 1, 2013, 2 pages.

Guo, Chuanxiong et al., "BCube: A High Performance, Server-centric Network Architecture for Modular Data Centers", ACM, SIGCOMM'09, Aug. 17-21, 2009, Barcelona, Spain.

"Hot Interconnects 22", IEEE Symposium on High Performance Interconnects, Aug. 26-28, 2014, 1 page, Google Headquarters, Mountain View, California.

Invitation to Pay Additional Fees and Partial Search Report dated Feb. 23, 2017 in related International Application No. PCT/EP2016/076755, 8 pages.

International Search Report and Written Opinion of the International Searching Authority, dated May 2, 2017, Corresponding to PCT/EP2016/076755, 33 pages.

Iyer, Sundar et al., "Techniques for Fast Shared Memory Switches", Stanford HPNG Technical Report TR01-HPNG-081501, 2001, 12 pages.

Kachris, Christoforos et al., "A Survey on Optical Interconnects for Data Centers", IEEE Communications Surveys & Tutorials, Oct. 1, 2012, pp. 1021-1036, vol. 14, No. 4.

Mandyam, Lakshmi et al., "Switch Fabric Implementation Using Shared Memory", Freescale Semiconductor, Inc., 2004, pp. 1-8.

Miao, Wang et al., "Novel flat datacenter network architecture based on scalable and flow-controlled optical switch system", Optics Express, Feb. 10, 2014, 8 pages, vol. 22, No. 3.

Miao, Wang et al., "Petabit/s Data Center Network Architecture with Sub-microseconds Latency Based on Fast Optical Switches", Ecoc-ID: 0630, 2015, 3 pages.

Padmanabhan, Krishnan et al., "Dilated Networks for Photonic Switching", IEEE Transactions on Communications, Dec. 1987, vol. COM-35, No. 12., pp. 1357-1365.

Parsons, N.J. et al., "Multidimensional Photonic Switches", Photonic Switching II, Proceedings of the International Topical Meeting, Apr. 12-14, 1990, pp. 364-369, Kobe, Japan.

Shekel, Eyal et al., "Optical packet switching", Proc. of SPIE, 2005, pp. 49-62, vol. 5625.

Suzuki, Keijiro et al., "Ultra-compact 8 × 8 strictly-non-blocking Si-wire PILOSS switch", Optics Express, Feb. 24, 2014, 8 pages, vol. 22, No. 4.

Tabatabaee, Vahid, "Switch Fabric Architectures", University of Maryland, ENTS689L: Packet Processing and Switching, Fall 2006, pp. 1-18.

U.K. Intellectual Property Office Search Report, dated Nov. 29, 2016, Received Dec. 1, 2016, for Patent Application No. GB1611197. 3, 3 pages.

Wu, Haitao et al., "MDCube: A High Performance Network Structure for Modular Data Center Interconnection", ACM, CoNEXT'09, Dec. 1-4, 2009, Rome, Italy.

Zahavi, Eitan, "Fat-tree routing and node ordering providing contention free traffic for MPI global collectives", Journal of Parallel and Distributed Computing, 2012, pp. 1-10.

Zahavi, Eitan et al., "Quasi Fat Trees for HPC Clouds and their Fault-Resilient Closed-Form Routing", HOTI 2014, pp. 1-21.

* cited by examiner

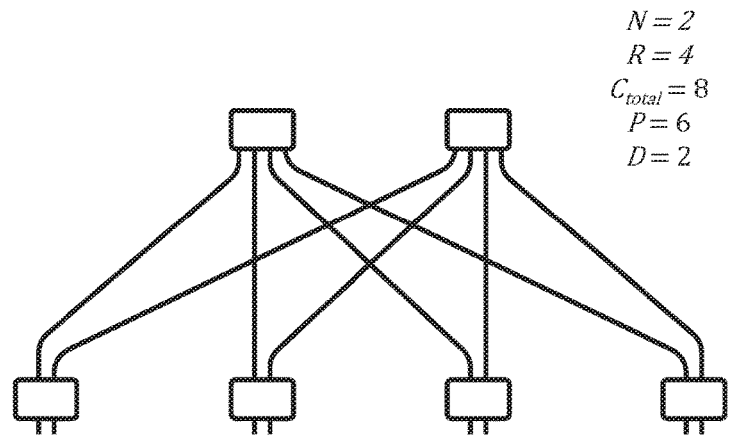
Fig. 14A – prior art
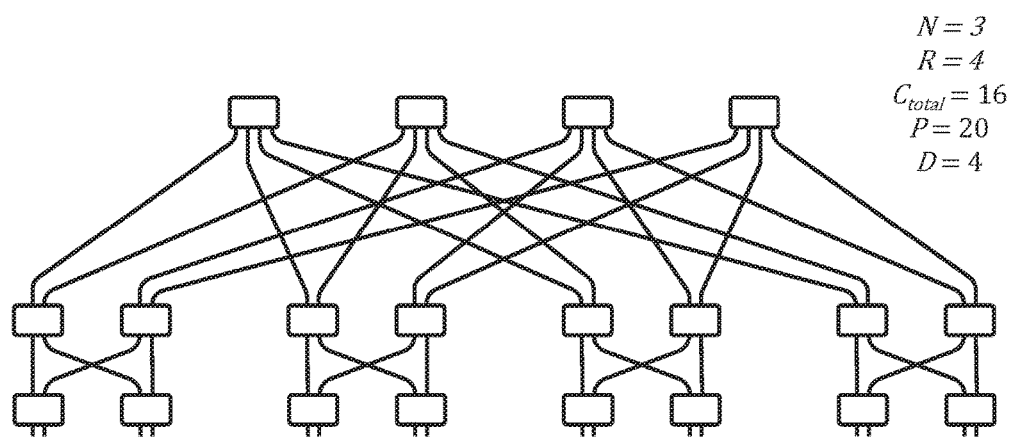
Fig. 14B – prior art

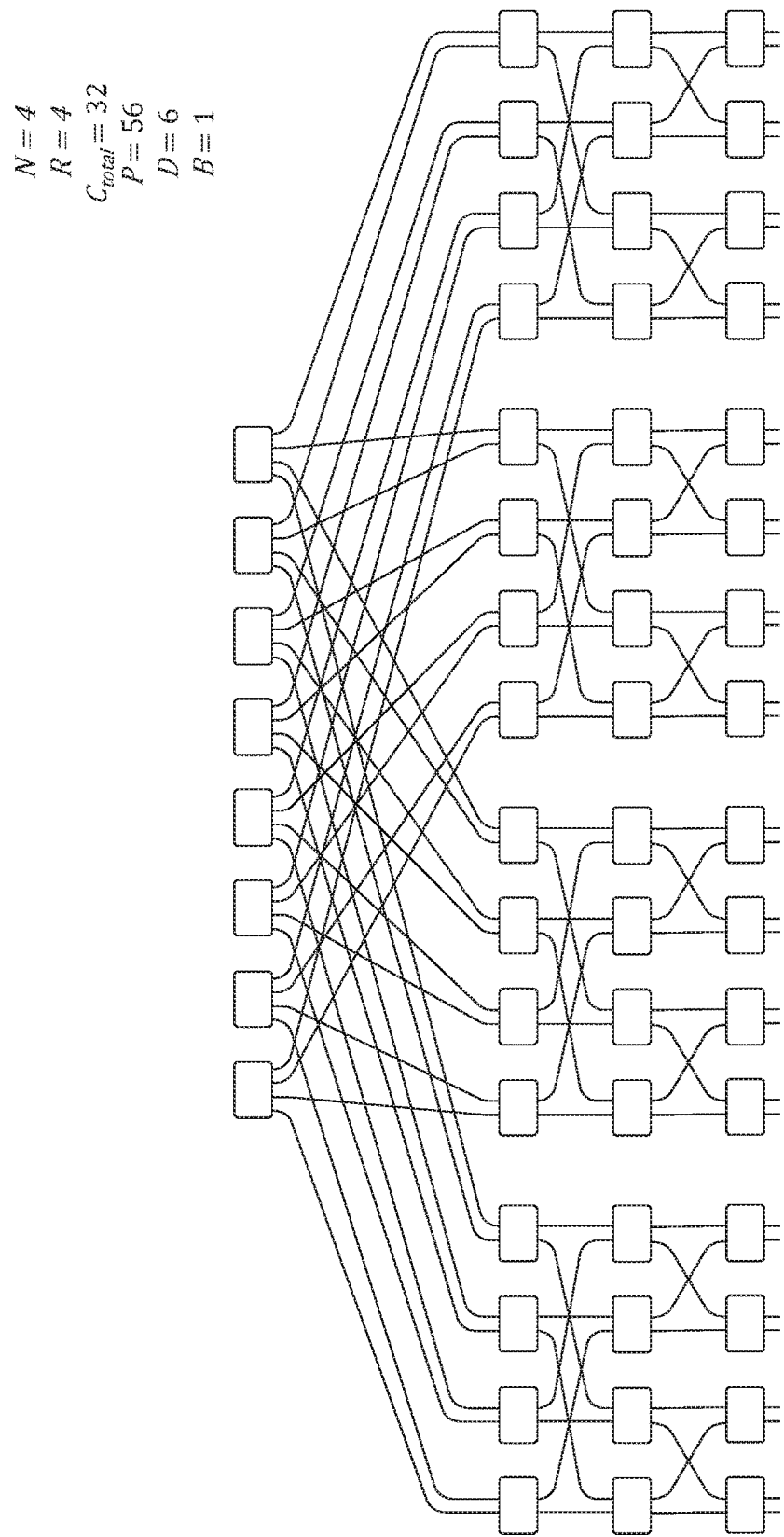
Fig. 14C – prior art

OPTOELECTRONIC SWITCH

CROSS-REFERENCE TO RELATED APPLICATION(S)

The present application is a continuation of U.S. patent application Ser. No. 15/072,314, filed Mar. 16, 2016, now U.S. Pat. No. 9,706,276, entitled "OPTOELECTRONIC SWITCH", which claims priority to and the benefit of U.S. Provisional Application No. 62/251,572, filed Nov. 5, 2015, entitled "Optical Switch Architectures", the entire content of both of which is incorporated herein by reference.

FIELD

One or more aspects of embodiments according to the present invention relate to switch modules which may be used in optoelectronic switches, and also to optoelectronic switches incorporating the switch modules.

BACKGROUND

The present and continuing increase in data traffic volumes and the requirement for speed of switching and reduced energy consumption in datacenters has driven a great deal of recent innovation. In particular, it has been realized that optical switching offers many of the desired properties but optical devices need to be controlled by and interfaced with electronic devices including traditional electronic data servers.

Optical devices themselves do not necessarily reduce the size or complexity of a switch. In order to improve flexibility in the assembly and application of optical switching units it is desirable to improve the scalability of an optical switch. One way of doing this relates to the topology of the components within the switch network. It is desirable to produce a highly scalable optical switching unit. Thus, there remains a requirement for a packet switch optimally benefiting from the speed of optics and the flexibility of CMOS electronics assembled in an architecture appropriate for huge scalability.

In order to most clearly describe a network topology, for example a computer network, or an optical switching network, as in embodiments of the present invention, the following terminology and notation may be employed:

- A graph G is a set of vertices V and a set of edges E, the edges connecting pairs of vertices. The graph may be expressed as G=(V, E). Accordingly, a network may be modelled as a graph, wherein nodes (i.e. individual switching elements) are represented by vertices, and the links between pairs of nodes are the graph edges.
- The physical topology of the network is the location in real, 3D space of the nodes and the links.
- The logical topology of the network is represented mathematically as the graph of the network G=(V, E).
- The radix R of a single switching element is the number of ports on that switching element. The switch ports may be either client ports (connected to external clients such as hosts or servers) or fabric ports (connected to other switching elements), or unconnected.
- The number of client ports per switching element=C, and the number of fabric ports per switching element=F.
- A path is a sequence of links connecting a source node to a destination node, and the length of a path is the number of links in the sequence. The minimal path between two nodes, is the path with the shortest length, and the diameter of the network is the longest minimal path between any two nodes.
- Switching elements in a switch may be arranged into N dimensions (also referred to herein as tiers).

A known, named network topology is the Folded Clos network. At present, this is a popular topology employed in datacenter networks and multi-chip switches. It is also known as the k-ary n-tree. The network may be described in terms only of R and N:

$C_{total}$ = total number of client ports, i.e. the number of clients which may be interconnected = $2\left(\frac{R}{2}\right)^N$.

$P$ = total number of switching elements = $(2N-1)\left(\frac{R}{2}\right)^{N-1}$ Diameter, $D = 2(N-1)$ Table 1 below shows the value of N, the number of client ports for various different values of the parameters, which indicates, as discussed above, the number of external clients which may be connected using this network with the given parameters.

TABLE 1

Values of N for a Folded Clos network having varying values of R and N.

| $C_{total}$ | N = 2 | N = 3 | N = 4 | N = 5 |
| --- | --- | --- | --- | --- |
| R = 4 | 8 | 16 | 32 | 64 |
| R = 8 | 32 | 128 | 512 | 2,048 |
| R = 12 | 72 | 432 | 2,592 | 15,552 |
| R = 16 | 128 | 1,024 | 8,192 | 65,536 |
| R = 24 | 288 | 3,456 | 41,472 | 497,664 |
| R = 32 | 512 | 8,192 | 131,072 | 2,097,152 |
| R = 64 | 2,048 | 65,535 | 2,097,152 | 67,108,864 |
| R = 128 | 8,192 | 524,288 | 33,554,432 | 2,147,483,648 |

FIGS. 14A to C show examples of Folded Clos network arrangements having different values of N and R, along with their corresponding values of $C_{total}$, P and D. Clearly, when used in real switching networks the number of switching elements employed is vastly higher than the number shown in these drawings. In these examples, the client ports are represented by the unconnected links on the bottom row of switching elements in each case. Herein, the term "leaves" may be used for switching elements which are connected to both clients and other switching elements, and "spines" may be used for those switches which connect only to other leaves. Throughout this application, the terms "spine" and "active switch" may also be used interchangeably.

SUMMARY OF THE INVENTION

At their most general, embodiments of the present invention provide an optoelectronic switch having a plurality of switching elements organized using an improved (physical) network topology which yields great improvements in scalability. In order to implement an optoelectronic switch which employs the improved physical topology, the switching elements making up said optoelectronic switch must have certain features, and certain connectivity capabilities. In particular, the switching elements acting as leaves, herein referred to as "switch modules", require certain internal components in order to perform optimally. Accordingly, a first aspect of embodiments of the present invention provides a switch module for use in an optoelectronic switch, the switch module having:

a client portion for connecting to an input device or an output device;

a first fabric portion and a second fabric portion, each for processing signals and communicating with other switch modules, the first fabric portion having a transmission side and a receiving side, the transmission side having:

a transmission side input for receiving a first electronic signal carrying information including information about a destination switch module of the first electronic signal, the first electronic signal received from either:

an output of the second fabric portion, or an input device, via the client portion;

a transmission side conversion means for converting said first electronic signal into a first plurality of optical signals containing the same information;

a transmission side multiplexer for converting the first plurality of optical signals into a multiplexed fabric output signal for transmission to an active switch, and the receiving side having:

a receiving side demultiplexer for receiving a multiplexed fabric input signal from an active switch and separating said multiplexed fabric input signal into a second plurality of optical signals;

a receiving side conversion means for converting the second plurality of optical signals into a second electronic signal, and a receiving side output for sending the second electronic signal to either:

a transmission side input of the second fabric portion, or an output device, via the client portion.

For the avoidance of confusion, it is noted that, in the following, the term "fabric portion" is used to describe the fabric port itself, i.e. the interface between the switch module and the network fabric (the links between switch modules), and all of the associated components within the switch module. Similarly, "client portion" is used to describe the client port itself, i.e. the interface with the external client, and all of the associated components within the switch module. An input device and/or an output device may refer to external clients such as servers or hosts.

It is preferable that the second fabric portion is configured to perform the same processing, both optical and electronic, as the first, so that e.g. when the second electronic signal is sent from the output of the first fabric portion to the input of the second fabric portion, the same processing can occur on the electronic signal in order for it to be transmitted elsewhere. In this way, the switch modules may act as intermediate switch modules (or spines), wherein data received is not forwarded directly to an output device, but rather to another switch module, either for subsequent further transmission to another switch module, or to an output device. Accordingly, the second fabric portion may include:

a transmission side input for receiving a second electronic signal carrying information including information about a destination switch module of that electronic signal, the second electronic signal received from either:

an output of the first fabric portion, or an input device, via the client portion;

a transmission side conversion means for converting said second electronic signal into a third plurality of optical signals containing the same information;

a transmission side multiplexer for converting the third plurality of optical signals into a multiplexed fabric output signal for transmission to an active switch;

a receiving side demultiplexer for receiving a multiplexed fabric input signal from an active switch and separating said multiplexed fabric input signal into a fourth plurality of optical signals;

a receiving side conversion means for converting the fourth plurality of optical signals into a third electronic signal, and a receiving side output for sending the third electronic signal to either:

a transmission side input of the first fabric portion, or an output device, via the client portion.

The switch module may also include more than one client portion, and preferably includes two client portions. Having an increased number of client portions on each switch module increases the number of external devices which can be connected to each switch module when the switch module is used in an optoelectronic switch.

The switch module may include more than a first and a second fabric portion, depending on the dimensionality of the optoelectronic switch in which it is to be employed. Then, the output of the second fabric portion may instead be configured to send signals to a third fabric portion, rather than the first.

Switch modules according to the first aspect of the present invention provide the functionality required to construct a scalable, multidimensional (i.e. N>1, using the terminology introduced in the background section of the present application) optoelectronic switch which is able to transfer an optical signal received at a client portion of one switch module to a client portion of another switch module. The conversions associated with the transmission side/receiving side conversion means allow the majority of the data transfer to occur in the optical domain, rather than the electronic domain. As a result, it is possible to transmit data at high data rates and over long distances, at a lower power and with lower power loss than would be the case in the electronic domain. Additionally, use of the optical domain enables wavelength division multiplexing to be used. A further important advantage of using the optical domain during active switching is bit-rate independence, wherein switch plane data operates at packet rate, and not bit rate.

As mentioned at the start of this section, the optoelectronic switch of (the second aspect of) the present invention employs a new topology, which presents several improvements over the aforementioned Folded Clos technology, and other topologies known to be used in optical switching networks. In general terms, a second aspect of the present invention provides an optoelectronic switch comprising an array of switch modules and active switches arranged in an improved physical topology. The switch modules are those modules according to the first aspect of the invention, which include both client ports and fabric ports and accordingly are connected both to the optical fabric and any external clients.

Thus, accordingly, switch modules according to the first aspect of the invention may be interconnected into an optoelectronic switch according to the second aspect of the present invention, wherein an N-dimensional optoelectronic switch for transferring an optical signal from an input device to an output device comprises a plurality of interconnected switch modules according to the first aspect of the invention, wherein:

the switch modules are arranged in an N-dimensional array, the $i^{th}$ dimension having a size $R_i$ (i=1, 2 . . . N), each switch module having an associated set of coordinates giving its location with respect to each of the N dimensions;

each switch module is a member of N sub-arrays $S_i$, each sub-array $S_i$ comprising $R_i$ switch modules whose coordinates differ only in respect of their location in the $i^{th}$ dimension, and each of the N sub arrays being associated with a different dimension;

each of the switch modules is configured to generate a multiplexed fabric output signal, each sub-array $S_i$ further includes an active switch having $R_i$ inputs and $R_i$ outputs, each input of each active switch is configured to receive a multiplexed fabric output signal from each of the $R_i$ switch modules in the sub-array, the active switch is configured to direct a multiplexed fabric output signal from any of its $R_i$ inputs to any one of the $R_i$ outputs, based on the destination information contained in the first electronic signal received at the transmission side input of the switch module from which the active switch received that multiplexed fabric output signal.

Signals sent from each of the $R_i$ outputs may form the multiplexed fabric input signals which may be received by another of the $R_i$ switch modules within the sub-array.

Here, the "size" $R_i$ of the $i^{th}$ dimension is most easily understood by considering e.g. 120 switch modules organized in a 4×5×6 array. Then, $R_1=4$, $R_2=5$, $R_3=6$. In other words the size of the $i^{th}$ dimension may also considered to be the length of the array in the direction associated with that dimension. It must be stressed that this does not mean that the modules are physically arranged in an e.g. 3D array—it is merely representative of the connections between the switch modules, as will be described in more detail below. This is clear from the fact that the switch modules may, for example, be arranged in a 5D array, which clearly cannot be done in real space. In the arrangement as set out above, it will be appreciated that the size $R_i$ of the $i^{th}$ dimension is the same as the number of inputs/outputs of the active switches associated with a sub-array $S_i$, in which the coordinate in that dimension varies. In this way, it can be ensured that an active switch is connected to all of the switch modules in that sub-array.

The overall interconnecting mesh formed between the fabric portions of all of the switch modules and including the active switches may be referred to as "the optical fabric" or "the switch fabric" and includes optical links connecting the various components. Preferably, the optical links are optical fibers. The optical links are also preferably bidirectional, which may be achieved by bundling two or more optical links inside a single cable. Alternatively, the optical links may be in the form of optical polymer waveguides embedded e.g. in a PCB or a silicon waveguide formed on or in a substrate. Similarly, "active switch" refers to a type of switch which is able to actively control the path which a signal traverses within it. Thus, the active switch is able to provide full-mesh connectivity, but without having to provide a full-mesh of interconnecting fibers, or the like. Furthermore, if the active switch receives $R_i$ different multiplexed signals to their $R_i$ inputs at the same time, each having different intended destinations, then it is capable of sending all of the signals simultaneously. The active switch preferably operates in a non-blocking fashion, and more preferably operates in a strictly non-blocking fashion rather than a rearrangeably non-blocking fashion. The active switches described here perform the function of the "spines" described above, in that they are connected only to switch modules, and not to external client devices.

In an illustrative example, wherein each of the active switches in the entire array have the same radix R (i.e. each active switch in the entire array has R inputs/outputs, regardless of the dimension/sub-array with which it is associated). These are the radix of each switch module R and the number of dimensions N. Then the following relations apply, using the notation as used in the Background section:

$$C_{total} = \left\lfloor \frac{R}{N+1} \right\rfloor R^N$$

Total number of leaves, i.e. switch modules, $P_1 = R^N$
Total number of spines, i.e. active switches, $$P_2 = \frac{N \cdot R^N}{N+1}$$

D=2N

Table 2 below shows values of $C_{total}$ for exemplary values of R and N, and shows that the number of clients which an optoelectronic switch according to the present invention is able to support is greatly improved with respect to a Folded Clos network. It is noted that such an improvement is still apparent in the case where the radices of switches in different arrays are not all the same. For manufacturing reasons, however, it is preferable that all of the active switches employed in the optoelectronic switch of the present invention are identical or substantially identical.

TABLE 2

Values of $C_{total}$ for an optoelectronic switch of the present invention, for varying values of R and N

| $C_{total}$ | N = 1 | N = 2 | N = 3 | N = 4 |
|---|---|---|---|---|
| R = 4 | 8 | 16 | 64 | N/A |
| R = 8 | 32 | 128 | 1024 | 4,096 |
| R = 12 | 72 | 576 | 5,184 | 41,472 |
| R = 16 | 128 | 1,280 | 16,384 | 196,608 |
| R = 24 | 288 | 4,608 | 82,944 | 1,327,104 |
| R = 32 | 512 | 10,240 | 262,144 | 6,291,456 |
| R = 64 | 2,048 | 86,016 | 4,194,304 | 201,326,592 |
| R = 128 | 8,192 | 688,128 | 67,108,864 | 6,710,886,400 |

In a 2D embodiment of the present invention, an optoelectronic switch includes an array of interconnected switch modules according to the first aspect of the invention, arranged in an X×Y array, having X columns of Y switch modules, and Y rows of X switch modules. Thus, each of the Y rows has an associated active switch (with X inputs/outputs), and each of the X columns has an associated active switch (with Y inputs/outputs). Each active switch provides a connection between all of the active switches in its associated row or column. In this case, it can be seen that each switch module is connected to two different active switches i.e. the one associated with its column and the one associated with its row.

Accordingly, switch modules used in such an optoelectronic switch each require two fabric portions.

Similarly, in a 3D embodiment of the present invention, an optoelectronic switch includes an array of interconnected switch modules according to the first aspect of the invention, arranged in an X×Y×Z array, having:

X columns (each column being made up of an Y×Z array),
Y rows (each row being made up of an X×Z array) and
X layers (each layer being made up of an X×Y array).

Then, each sub-array of switch modules, each of which are located in e.g. the same column/row, but different layers, has an associated active switch. Thus, there are X×Y active switches associated with sub-arrays containing Z switch modules, which differ only in their layer, each active switch having Z inputs/outputs. And, there are X×Z active switches associated with sub-arrays containing Y switch modules, which differ only in their row, each active switch having Y inputs/outputs. And, there are Y×Z active switches associated with sub-arrays containing X switch modules, which differ only in their column, each active switch having X inputs/outputs. Analogously to the 2D case above, each switch module is connected to three different active switches i.e. one associated with each of the sub-arrays described earlier in the paragraph. Therefore, in a 3D embodiment of the optoelectronic switch according to the present invention, each switch module requires three fabric portions.

From the above, it can be seen that it is preferable that each switch module has at least N fabric portions, each of the N fabric portions associated with a different sub-array of which the switch module is a member. Accordingly, the switch module can transfer data, via the active switch associated with that sub-array, to any other switch module in that sub-array, via the dedicated fabric portion for that sub-array. After an optical hop has taken place, the signal arrives at a different switch module which is a member of a different set of sub-arrays from the first, and can then perform the same process to send the data to another switch module having a sub-array in common. In this way, all data transfers from one switch module to another can occur in a series of optical hops and electronic hops.

In this arrangement, it is possible to send data from any switch module in the array, to any other switch module in the array by a maximum of N optical hops (where an optical hop is a hop which involves the signal traversing the optical fabric, via an active switch). This is possible because the individual switch modules are able to act as intermediate switch modules, i.e. because the output of a first fabric portion can send an electronic signal (e.g. a packet of data) to the input of another fabric portion on the same switch module, and correspondingly an input of a first fabric portion on a switch module can receive data from the output of a second switch module. The electronic signal may be transferred between two fabric portions using an integrated switch, such as an electronic crossbar switch, or an electronic shared-memory switch providing connections between two fabric portions, two client portions or a connection between one fabric portion and one client portion. Thus, during a data transfer operation, data can perform an optical hop to another fabric portion located in the same sub-array, via the active switch associated with that subarray. Then data can perform an electronic hop through the switch module itself, to a fabric portion which is associated with a different sub-array, and then a second optical hop may occur—the process being repeated up to N times, until the packet of data reaches its final destination, i.e. the switch module having the client portion via which the data (e.g. in packet form) is transferred to the output device.

There are more than N fabric portions on each switch, flexibility is provided for extending the optoelectronic switch into higher dimensions. For example, consider the case of a 2D optoelectronic switch having $M^2$ modules organized in a square array. This could be extended into a 3D optoelectronic switch having $M^3$ switch modules organized in a cubic array (i.e. N layers of $N^2$ switches) by connecting the vacant fabric portions on each switch module having the same row and same column in each of the (newly-defined) layers via a new active switch, to define a new sub-array and associated active switch. Excess fabric ports may also be exploited by providing more than one fabric portion to connect a switch module to another switch module within the same sub-array.

The transmission side conversion means of each switch module preferably also includes a transmission side packet processor, configured to receive the first electronic signal in the form of a packet, preferably an original packet, having a packet header containing the destination information. In addition to the data itself, the information included in the packet may include information relating to the destination of that packet, e.g. the client portion to which it should be ultimately sent. The packet header may further include various pieces of information, including source and destination address, packet length, protocol version, sequence number, payload type, hop count, quality-of-service indicator, and others.

The transmission side packet processor may be configured to perform packet fragmentation, wherein packets of data having the same destination switch module are arranged into frames having a predetermined size, and wherein the packets of data may be split up into a plurality of packet fragments, arranged in a corresponding plurality of frames, and wherein optionally one frame may contain data from one or more packets of data. Each packet fragment preferably has its own packet fragment header, which includes information at least identifying the packet to which that packet fragment originally belonged, so that the packet may be reconstructed after subsequent processing and transmission. For example, consider the case where the packet processor is configured so that the frame payload size is 1000 B, and three packets of 400 B, 800 B and 800 B are input into the switch module. If each of these were to be sent in separate frames, of one packet each, this would represent an efficiency of (400+800+800)/3000=67%. However, by using packet fragmentation, a first frame may include the 400 B packet, and 200 B of the first 800 B packet, and then a second frame may include the second 800 B packet and the remaining 200 B of the first 800 B packet. This leads to an efficiency of 100%. The frames that are constructed by this process represent packets of data in their own right, and so further fragmentation may occur at intermediate switch modules, when the packet undergoes more than one optical hop in order to reach the destination switch module.

In order to maximize efficiency, subsequent processing of a frame (e.g. forwarding said frame to be converted into the first plurality of optical signals) may not occur until the filling proportion of a frame reaches a predetermined threshold, preferably more than 80%, more preferably more than 90%, and most preferably 100%. The packets may alternatively be sent for subsequent processing after a predetermined amount of time has elapsed. In this way, if packets of data for a given switch module cease to arrive at the packet processor, a frame which is still below the threshold filling proportion may still be sent for subsequent processing rather than lying stagnant on the packet processor. The predetermined amount of time may be between 50 and 1000 ns, but is preferably between 50 and 200 ns. Most preferably, the time interval is around approximately 100 ns. Accordingly, the transmission side packet processor may include or be associated with a transmission side memory in which to temporarily store incomplete frames during their construction. The elapsed time may be varied depending upon traffic demand; typically, the higher the rate of traffic flow, the shorter will be the elapsed time and lower rates of traffic flow may lead to increased time intervals.

When the packet processor is configured to perform packet fragmentation, the receiving side conversion means preferably also includes a receiving side packet processor, which is configured to recreate the original packets from the packet fragments, when the original packets are spread over more than one frame. This may be done with reference to the packet fragments headers described above. When a packet undergoes several separate fragmentations by successive intermediate switch modules on its journey from source to destination, final reassembly of the packet by the receiving side packet processor may be delayed until all of the constituent parts of the original packet have arrived at the destination switch module. Accordingly, the receiving side packet processor may include or be associated with a receiving side memory in order to temporarily store the constituent parts.

The transmission side conversion means may include a modulator configured to receive light from a light source, and more preferably a plurality of modulators, preferably optical modulators. The optical modulators may be phase or intensity modulators, for example electro-absorption modulators (EAMs), Franz-Keldysh modulators, modulators based upon the quantum confined Stark Effect, Mach-Zehnder modulators, and the plurality of modulators preferably includes 8 modulators. Each modulator may be associated with a single light source only or may be lit by fewer light sources, where the light sources are shared between modulators. Each modulator may be configured to receive an electronic signal from the input or the transmission side packet processor, and unmodulated light from the light source. By combining the two, the modulator generates a modulated optical signal having the same wavelength as the unmodulated light from the light source, and carrying the information carried by the original electronic signal. This modulated optical signal may then be transmitted to the transmission side multiplexer. The light source is preferably in the form of a laser, in order to generate a substantially monochromatic beam of light restricted to a narrow band of wavelengths. In order to minimize losses, the modulators are preferably configured to receive light having a wavelength in the C-band or L-band of the electromagnetic spectrum, i.e. from 1530 nm to 1625 nm. More preferably, the light has a wavelength falling within the C-band or "erbium window", having a wavelength from 1530 nm to 1565 nm.

The laser may either be a fixed-wavelength laser or a tunable laser. In an array of modulators, the light source associated with each modulator should have a different wavelength, with non-overlapping bandwidths, in order to minimize crosstalk in the multiplexer. When the light source is a laser, the modulator may be in the form of an electro-absorption modulator (EAM), which uses a changing electric voltage to modulate the intensity of the laser light to carry the information contained in an electronic signal. Using an EAM means that only the intensity of the laser light is changed, rather than the frequency, and thus prevents any change in the wavelength of the modulated optical signal.

When there are a plurality of modulators, the transmission side packet processor may also be configured to perform packet slicing, wherein a frame (as constructed by the packet fragmentation process described above) or a packet of data is sliced into a first plurality of electronic signals. Each of the first plurality of electronic signals is then sent to a different modulator in the plurality of modulators, whereby they are converted into the first plurality of optical signals. The receiving side conversion means may include a photodetector such as a photodiode for converting the second plurality of optical signals into a second plurality of electronic signals. More preferably, the receiving side conversion means may include a plurality of photodetectors. The receiving side packet processor may be configured to recombine the second plurality of electronic signals, which represent packet slices, into the second electronic signal. By dividing the packet or frame into a plurality of slices before sending to another switch module, the data can be sent using a number of different wavelengths which are multiplexed into a single optical link by the multiplexer. In this way, several pieces of information can be sent in parallel, and leads to increased bandwidth and more efficient data transfer.

In the event where the transmission side packet processor is configured to perform both packet slicing and packet fragmentation, the packet fragmentation step (i.e. the formation of frames of data) occurs first, followed by slicing of the frame. Correspondingly, on the destination (or intermediate) switch module which receives the signal, the packet processor recombines the second plurality of electronic signals (i.e. packet slices) into a single second electronic signal before the original packets are reconstructed from the frames.

After fragmentation, frames are constructed which each contain data having intended only for a single destination switch module. After this, data is converted into the first plurality of optical signals differing in wavelength, it is wavelength multiplexed by the transmission side multiplexer to form the multiplexed fabric output signal. Preferably, the switch module is configured to operate in burst mode, wherein the switch module is configured to send the multiplexed fabric output signal a series of successive bursts, each burst including packets and/or packet fragments from a single frame of data, and such that each burst includes only packets and/or packet fragments having the same destination module. Each successive burst may comprise a frame of data having a different destination switch module. Pairs of sequential bursts may be separated by a predetermined time interval, which may be between 50 and 1000 ns, but is preferably between 50 and 200 ns. Most preferably, the time interval is around approximately 100 ns. Preferably, all of the fabric portions which are connected to the active switch in a single sub-array are configured to operate synchronously, i.e. each fabric portion sends a burst to an input of the active switch at the same time. In this way, the active switch can route each signal to the next switch module in one switching action.

The transmission side packet processor may also be configured to carry out error correction on incoming packets of data. This may be done by means such as error detection and retransmission or forward error correction (FEC). Additionally, the switch module may also include a management portion, which is configured to perform fabric management processes including initialization, programming routing/forwarding tables, fault reporting, diagnostics, statistics reporting and metering.

In order to control the switching of the data by the active switches, each sub-array of switch modules may include an arbiter, which is configured to control the operation of the active switch included in that sub-array, based on the destination information stored in packets of data to be switched. This allows the provision of a route which ensures that all data reaches its destination in a non-blocking fashion, and minimizes the occurrence of bottlenecks. The arbiter may be connected to a switch driver which controls the operation of the switch. The arbiter may be connected to a transmission side packet processor in each switch module of the sub-array in which it is included. Alternatively, each fabric portion of each switch module may further include a controller, via which the arbiter may be connected to the transmission side packet processor. When a packet of data is received at the transmission side packet processor, the transmission side packet processor is configured to send a request to the arbiter, the request preferably identifying the destination switch module of a packet of data. The transmission side packet processor may lookup, in a lookup table or otherwise, which output of the active switch to which it is connected corresponds to the destination switch module which is the subject of the request. More specifically, the output which is connected either to that destination switch module or an intermediate switch module to which the next optical hop should occur, and then requests that output itself, to the arbiter.

Accordingly, one or both of the transmission side packet processor and the arbiter may include a lookup table, containing information relating switch modules in the sub-array to the $R_i$ outputs of the active switch. When the request is made, the arbiter then establishes a scheme which ensures that, to the greatest extent possible, that each packet is able to perform its next optical hop. More specifically, the arbiter may be configured to perform a bipartite graph matching algorithm in order to calculate pairings between the $R_i$ inputs and the $R_i$ outputs of the active switch, such that each input is paired with at most one output and vice versa. Naturally, in some cases, where e.g. several fabric portions send large amounts of data all of which is intended for the same output of the active switch, the request cannot be met. Accordingly, the arbiter may be configured to store information relating to requests that cannot be met, in a request queue. Then, until these requests are met, the associated data is buffered on the switch module, e.g. in the transmission side packet processor or in a separate transmission side memory. In this way, requests that cannot be met are delayed rather than dropped, e.g. when a local bottleneck occurs at the active switch. In other words, the arbiter maintains the state of a buffer memory or a virtual output queue (VOQ) on the switch modules, this state can be in the form of counters (counting e.g. the number of packets or bytes per VOQ), or in the form of FIFOs (first-in, first-out) that store packet descriptors. However, the actual packets themselves remain stored on the switch module rather than at the arbiter.

When it is necessary for a packet to perform more than one hop in order to reach its destination switch module, the route may be deduced entirely from a comparison between the coordinates of the source switch module and the destination switch module. For example, in a process known as dimension ordered routing, the first hop may match the first coordinate of the source and destination switch modules, the second hop may match the second coordinate of the source and destination switch modules and so on, until all of the coordinates match, i.e. until the packet has been transferred to the destination switch module. For example, in a four-dimensional network, if the source switch module were to have coordinates (a, b, c, d) and the destination switch module were to have coordinates (w, x, y, z), then the dimension-ordered route might be: (a, b, c, d)→(w, b, c, d)→(w, x, c, d)→(w, x, y, d)→(w, x, y, z). At any point along the route, the packet processor may compare the coordinates of the source switch module against the coordinates of the destination switch module, and determine which coordinates do not yet match. Then it will decide to route along the non-matching directions, e.g. with the lowest index, or the highest index.

The active switch of the present invention may be in the form of an optical active switch. Such an optical active switch may be based on an arrangement of Mach-Zehnder interferometers (MZIs) and more specifically may be in the form of an MZI cascade switch. An MZI cascade switch includes a plurality of MZIs, each having two arms which split at an input coupler, with two arms feeding the split paths into an output coupler where they are recombined, and two output portions. The plurality of MZIs are preferably arranged to provide a pathway from each input to each output of the MZI cascade switch. To the greatest extent possible the arms have the same length. Alternatively, where it is desirable to have a default output, the arms may be unbalanced. Each MZI may include an electro-optical region at one or both arms, in which the refractive index depends on a voltage applied to the region via one or more electrodes. The phase difference of light travelling through the electro-optical region can therefore be controlled by application of a bias via the electrodes. By adjusting the phase difference, and therefore the resulting interference at the output couple, the light can be switched from one output of the MZI to the other. Preferably, the MZI cascade switch has $R_i$ inputs and $R_i$ outputs, and these may be made up, for example, of a plurality of 1×2 and 2×1 MZIs, arranged to provide a pathway from each input to each output. A MZI cascade switch, or any other active switch such as this is beneficial over a full mesh for connecting $R_i$ interconnecting switch modules when $R_i$ is 5 or more, since a full mesh requires ½·$R_i$($R_i$−1) optical fibers to connect all of the fabric portions, whereas an active switch requires only $2R_i$ optical fibers. It is possible to create an MZI cascade switch with $R_i=2^n$ inputs and outputs by building $R_i$ "1×$R_i$ demux trees" and $R_i$ "$R_i$×1 mux trees", wherein each tree includes n stages of 1×2 (demux) or 2×1 (mux) switches, with $2^k$ switches at the $k^{th}$ stage. An additional port may be supported on each cascade switch by building $R_i+1$ trees on each side and omitting an internal connection so that an input is not connected to the output which is connected to the same switch as itself. An MZI cascade switch such as this is largely wavelength-agnostic, and so is able to switch the whole multiplexed fabric output signal from input to output without requiring any demultiplexing/multiplexing at the inputs and outputs.

Alternatively, the active switch may be in the form of an electronic active switch, such as an electronic crossbar switch. More preferably, the electronic active switch may be an electronic shared memory switch. An electronic shared memory switch is an electronic crossbar switch which also includes a memory. The presence of a memory within the switch is advantageous since it means that the switch can perform not only switching, but also buffering, i.e. storing a queue of packets when a bottleneck arises at the electronic shared memory switch, as described above. This means that the electronics on the packet processor can be simplified.

In order to use an electronic, rather than optical active switch in the architecture of the present invention, the multiplexed fabric output signal must be converted into a signal which can be switched electronically. Accordingly, the electronic active switch may include an optical-to-electrical converter at each input for converting the multiplexed fabric output signal from an optical signal to an electronic active switching signal; and an electrical-to-optical converter at each output for converting the electronic active switching signal to an optical signal in the form of the multiplexed fabric input signal, wherein the electronic active switch is configured to switch the electronic active switching signal from any of its $R_i$ inputs to any of its $R_i$ outputs. Furthermore, in order to deal with the multiplexed nature of the signals, the optical-to-electrical converter may include a demultiplexer for demultiplexing the multiplexed fabric output signal into a first plurality of intermediate optical signals, each of which is converted, preferably by a corresponding plurality of photodetectors, into an intermediate electronic active switching signal for switching to the desired output, and the electrical-to-optical converter may be configured to convert the plurality of switched intermediate electronic active switching signals into a second plurality of intermediate optical signals, and further includes a multiplexer for multiplexing said second plurality of intermediate optical signals to form the multiplexed fabric input signal. In preferred embodiments, the electronic active switch may be configured to temporarily store a queue of packets or frames of data when a request relating to said packets or frames cannot be met.

Any or all of the multiplexer, transmission side multiplexer, demultiplexer and receiving side demultiplexer is preferably in the form of an arrayed waveguide grating (AWG), which is a passive device. An AWG allows a plurality of optical signals of different wavelengths to be carried along a single optical fiber. Because the wavelengths of the plurality of modulated optical signals produced by the modulators are all different, the multiplexed fabric output signal produced by the AWG suffers from little to no crosstalk, since light of different wavelengths interferes only linearly. Alternatively, instead of an AWG, the multiplexed signal may be broadcast to a number of wavelength-selective filters, each tuned to receive a wavelength of one of the desired split signals.

An important consideration in switching systems such as the switch of the present invention is that of bandwidth. In the following discussion "bandwidth" is used to refer to the maximum rate of data transfer of which a particular portion is capable, and is typically measured in gigabits per second (herein abbreviated to "Gbps") Specifically, it is important to ensure that there is a conservation of bandwidth on both a local and global scale. In order to ensure that it is not possible for more data to enter a switch module in a given time than can be transmitted away from the switch module in the same time (i.e. resulting in a bottleneck which is localized onto that switch module), the total bandwidth of the client portions on a switch module preferably does not exceed the total bandwidth of the fabric portions on the same switch module. More preferably, the total bandwidth of the fabric portions on a switch module exceeds the total bandwidth of the client portions on the same switch module, and most preferably, the bandwidth of each fabric portion on a switch module exceeds, or is equal to, the total bandwidth of all of the client portions on that switch module. In this way, local bottlenecks caused by an unexpectedly large volume of incoming data from a plurality of client portions, all directed to the same fabric portion on the same switch module, can be avoided. In particular, this allows all signals to be multiplexed together for subsequent transmission in a non-blocking fashion.

In a preferred embodiment, the active switches are located on or in, and preferably connected to an optical backplane. Preferably, the backplane contains the optical links for connecting the switch modules to the active switches, thus providing the connections between each switch module and each active switch with which each of said switch modules shares a sub-array. More specifically, each of the optical links may provide a connection for conveying the multiplexed fabric output signal between a transmission side multiplexer on a switch module and an input of an active switch. When a backplane is used in conjunction with optical active switches as described above, or the like, an active optical backplane module (AOBM) may be used. The switch modules may be separable or detachable from the backplane, so that they can be rearranged, depending on the external requirements. Accordingly, the switch modules may also include a connection means for connecting to the optical backplane. The connection means may include arrays of single mode optical fibers, linked with MPO connectors or similar.

According to a third aspect of the present invention, there is provided an optical backplane for use in an N-dimensional optoelectronic switch, the optical backplane arranged to provide connections between an N-dimensional array of switch modules, arranged in an N-dimensional array, the $i^{th}$ dimension having a radix of $R_i$ (i=1, 2 ... N), wherein each switch module has an associated set of coordinates giving its location with respect to each of the N dimensions and each switch module is a member of N sub-arrays $S_i$, each sub-array $S_i$ comprising $R_1$ switch modules whose coordinates differ only in respect of their location in the $i^{th}$ dimension, and each of the N sub arrays being associated with a different dimension, the optical backplane including:

an array of active switches each having $R_i$ inputs and outputs, one associated with each sub-array $S_i$ of switch modules, the array of switches configured such that, when the array of switch modules is connected to the optical backplane:

each input of each active switch is connected via an optical link to each of the $R_i$ switch modules in the associated sub-array $S_i$, the active switch is configured to direct signals, received from the optical links, from any of its $R_i$ inputs to any one of the $R_i$ outputs.

According to a fourth aspect of the present invention, there is provided a method for switching a packet of data from a first switch module to a second switch module using the N-dimensional optoelectronic switch according to the second aspect of the invention. It should be noted that any of the above-described optional features can apply in conjunction with the method of the fourth aspect of the invention, as well as with the hardware of the first, second and third aspects. The method includes the following steps:

(a) receiving, at the input of a fabric portion of the first switch module, a packet of data carrying information identifying an intended destination switch module;

(b) converting the packet into a first plurality of optical signals containing the same information;

(c) multiplexing the first plurality of optical signals into a multiplexed fabric output signal;

(d) transmitting said multiplexed fabric output signal to an input of an active switch which is located in the same sub-array $S_i$ as both the first and second switch modules;

(e) switching the multiplexed fabric output signal to an output of the active switch which corresponds to the second switch module, to generate a multiplexed fabric input signal;

(f) demultiplexing, at a first fabric port of the second switch module, the multiplexed fabric input signal into a second plurality of optical signals;

(g) converting the second plurality of optical signals back into the original packet of data; and (h) forwarding the packet of data to either a client portion of the second switch module, or to an input of a second fabric portion of the second switch module.

Such a method is suitable for e.g. switching a signal from a source switch module to a destination switch module when the source and destination switch modules are located in the same sub-array. Alternatively, the method may be suitable for switching from a source switch module to an intermediate switch module. The method may be adapted to transmit a signal to a third switch module, such as a destination switch module, with the addition of the following steps:

a. (i) receiving at the input of the second fabric port of the second switch module the packet of data carrying information identifying the destination switch module;

(j) converting the packet into a third plurality of optical signals containing the same information;

(k) multiplexing the third plurality of optical signals into a multiplexed fabric output signal;

(l) transmitting said multiplexed fabric output signal to an input of active switch which is located in the same sub-array $S_i$ as both the second and third switches;

(m) switching the multiplexed fabric output signal to an output of the active switch which corresponds to the third switch module, to generate a multiplexed fabric input signal;

(n) demultiplexing, at a first fabric port of the third switch module, the multiplexed fabric input signal into a second plurality of optical signals;

(o) converting the second plurality of optical signals back into the original packet of data.

Since the optoelectronic switch is suitable for transferring an optical signal from an input device to an output device, before step (a), an optical signal may be received from an input device, and after step (h) or step (o) depending on whether an intermediate optical hop is required, the packet of data may be forwarded to an output device.

In some embodiments, rather than each sub-array including a single active switch, the sub-arrays may include a plurality or set of active switches, accordingly, another aspect of the present invention may provide N-dimensional optoelectronic switch for transferring an optical signal from an input device to an output device, the optoelectronic switch comprising a plurality of the switch modules of claim 1, the switch modules being interconnected, wherein:

the switch modules are arranged in an N-dimensional array, the $i^{th}$ dimension having a size $R_i$ (i=1, 2 ... N), each switch module having an associated set of coordinates giving its location with respect to each of the N dimensions;

each switch module is a member of N sub-arrays $S_i$, each sub-array $S_i$ comprising $R_i$ switch modules whose coordinates differ only in respect of their location in the $i^{th}$ dimension, and each of the N sub-arrays being associated with a different dimension;

each of the switch modules is configured to generate a multiplexed fabric output signal; each sub-array $S_i$ further includes one or more active switches, arranged to provide connections between all of the switch modules in that sub-array;

an input of each active switch is configured to receive a multiplexed fabric output from one or more of the $R_i$ switch modules in the sub-array; and each of the one or more active switches is configured to direct a multiplexed fabric output signal from any switch module in the sub-array to any other switch module in the sub-array, based on the destination information contained in the first electronic signal received at the transmission side input of the switch module from which the active switch received the multiplexed fabric output signal.

In particular, in some embodiments of the above aspect of the invention, one sub-array of $R_i$ switch modules includes only a single active switch having $R_i$ inputs and $R_i$ outputs, and:

each input of the active switch is configured to receive a multiplexed fabric output signal from each of the $R_i$ switch modules in the sub-array, each of the switch modules is configured to receive a multiplexed fabric output signal from one of the $R_i$ outputs of the active switch, and the active switch is configured to direct a multiplexed fabric output signal from any of its $R_i$ inputs to any one of the $R_i$ outputs, based on the destination information contained in the first electronic signal received at the transmission side input of the switch module from which the active switch received the multiplexed fabric output signal.

In other embodiments, at least one of the sub-arrays $S_i$ may include $P_{sub}$ active switches, preferably arranged to form a network connecting each switch module in the sub-array with each other switch module in the sub-array. $P_{sub}$ may be the same for all sub-arrays. Alternatively, $P_{sub}$ may be the same for all sub-arrays associated with a given dimension, but $P_{sub}$ may differ from dimension to dimension. In some embodiments, for sub-arrays associated with some dimensions there may be only a single active switch interconnecting the switch modules within those sub-arrays, and a plurality or set of $P_{sub}$ active switches present in sub-arrays associated with other dimensions. This enables the optoelectronic switch to be adapted to the needs of the client. Using a plurality of active switches within a sub-array eliminates the need for large radix active switches, replacing them with several active switches having a small radix. In preferred embodiments, $P_{sub}$ may be equal to the number of client ports on each switch module.

The plurality or set of $P_{sub}$ active switches may interconnect the switch modules in a given sub-array in a Clos network, a folded Clos network, a Clos-like network, or any other type of network having suitable path redundancy. Since bidirectional links are preferably employed, a folded Clos network may be used. Using a Clos network topology to interconnect all of the switch modules within a given sub-array allows the optoelectronic switch to be scaled to allow a large increase in the number of external clients which may be connected to each other, without the need to use unwieldy, and potentially costly active switches having large radices.

It is envisaged that similar advantages could be achieved by providing an optoelectronic switch for transferring an optical signal from an input device to an output device comprises a plurality of interconnected switch modules according to the first aspect of the present invention, wherein:

the switch modules are arranged in an N-dimensional array, the $i^{th}$ dimension having a radix of $R_i$ (i=1, 2, ... N), and each switch module having an associated set of coordinates giving its location with respect to each of the N dimensions;

each switch module is a member of up to N sub-arrays, the N sub-arrays associated with the set of coordinates of the switch module concerned;

the switch modules are connected by an array of active switches each having inputs and outputs, wherein each active switch is associated with a given sub-array or given sub-arrays of the array of switch modules, and, in use:

each input of each active switch is configured to receive a multiplexed fabric output signal from a switch module to which it is connected, each active switch is configured to direct signals from any one of its inputs to any one of its outputs, based on the destination information contained in the first electronic signal received at the transmission side input of the switch module from which the active switch received that multiplexed fabric output signal, and signals sent from an output of the active switch form multiplexed fabric input signals which may be received by another switch module to which the active switch is connected.

BRIEF DESCRIPTION OF THE DRAWINGS

These and other features and advantages of the present invention will be appreciated and understood with reference to the specification, claims, and appended drawings wherein:

FIGS. 14A-C show schematic diagrams of known Folded Clos networks.

DETAILED DESCRIPTION

The detailed description set forth below in connection with the appended drawings is intended as a description of exemplary embodiments of a switch module, and an optoelectronic switch, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
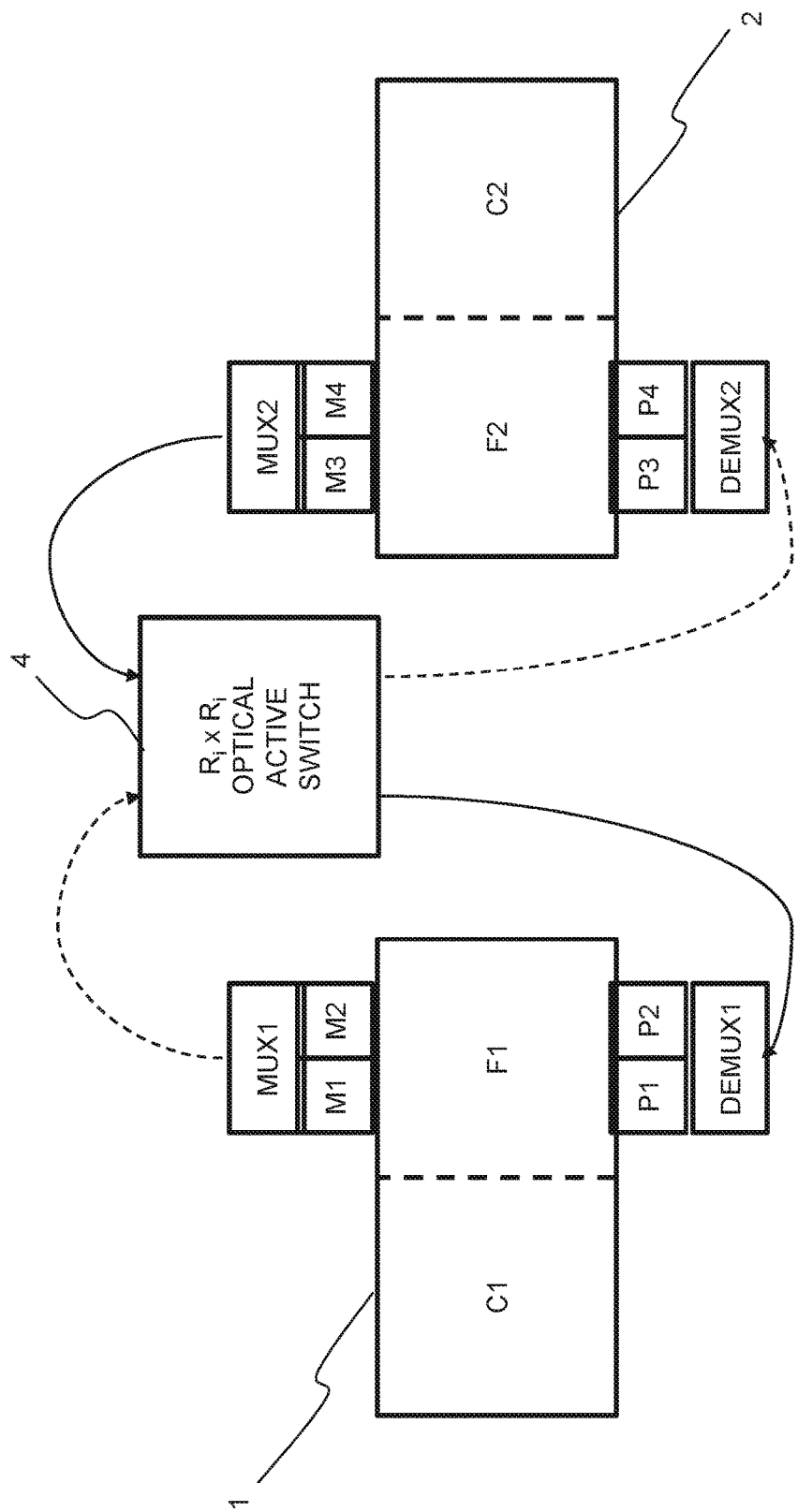
FIG. 1 is a schematic diagram illustrating the way in which two switch modules may be connected in an embodiment of the invention.

FIG. 1 is a schematic illustration which depicts a typical connection between two switch modules according to the switch architecture of embodiments of the present invention. In this drawing, only two photodetectors P and two modulators M are shown on each switch module, in order to illustrate the connections between the switch modules.

Switch module 1 has a fabric side F1 for connection with the other switch modules present in the optoelectronic switch (in this schematic, only switch module 2) and a client side C1 for connection to external apparatus. On the fabric side F1 of switch module 1, there are two electro-absorption modulators M1, M2, the outputs of which are incident on a multiplexer MUX1, which in this case is an AWG. MUX1 combines the signals exiting M1 and M2 and transmits them (dashed arrow) to the $R_i \times R_i$ optical active switch (herein "the optical active switch" unless context clearly dictates otherwise) 4, which has $R_i$ inputs and $R_i$ outputs. The characteristics of this switch are described in more detail below.

The optical active switch 4 transfers the signal from the input at which the multiplexed signal arrives from MUX1 to an output, depending on the intended destination switch module of the signal, in this case switch module 2. The scheme of control by which the destination switch module is determined will be described in more detail later. From the output of the optical active switch 4, the signal is transmitted to the destination switch module 2 (dashed arrow). The signal is incident on demultiplexer DEMUX2 of switch module 2. There, the multiplexed signal is demultiplexed into its constituent individual signals, each of which is incident on a single photodetector P3, P4. From the photodetectors P3, P4 the signal may be further transmitted to a client portion on the client side C2 of switch module 2, or (in the case where the optoelectronic switch is multidimensional) it may be transmitted back to the fabric side F2 for further transmission. The solid arrows in FIG. 1 show an alternative transmission of a signal from switch module 2 to switch module 1. The arrows in the drawing (both dashed and solid) represent WDM optical connections.

Figure 2:
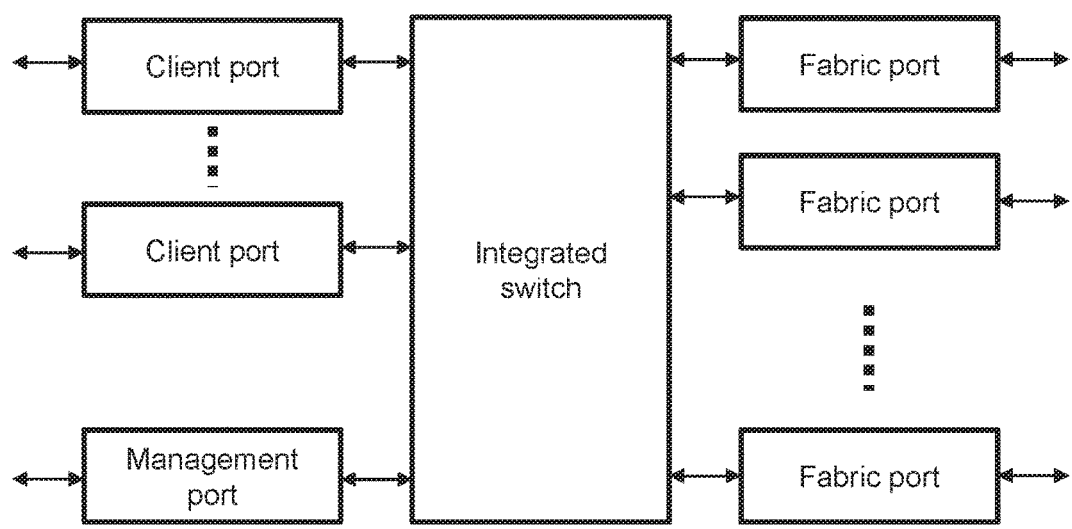
FIG. 2 is a schematic diagram of a switch module, identifying the different functional parts.

FIG. 2 shows a schematic of a typical switch module employed in embodiments of the present invention. Each switch module includes an integrated switch section, having a client side and a fabric side, as shown in the previous drawing. The number of client ports and fabric ports depends on the needs of the product, and on bandwidth constraints. In the switch module shown in FIG. 2, there is also a management portion, which is configured to perform fabric management processes such as initialization, programming routing/forwarding tables, fault reporting, diagnostics, statistics reporting, metering and the like.

Figure 3:
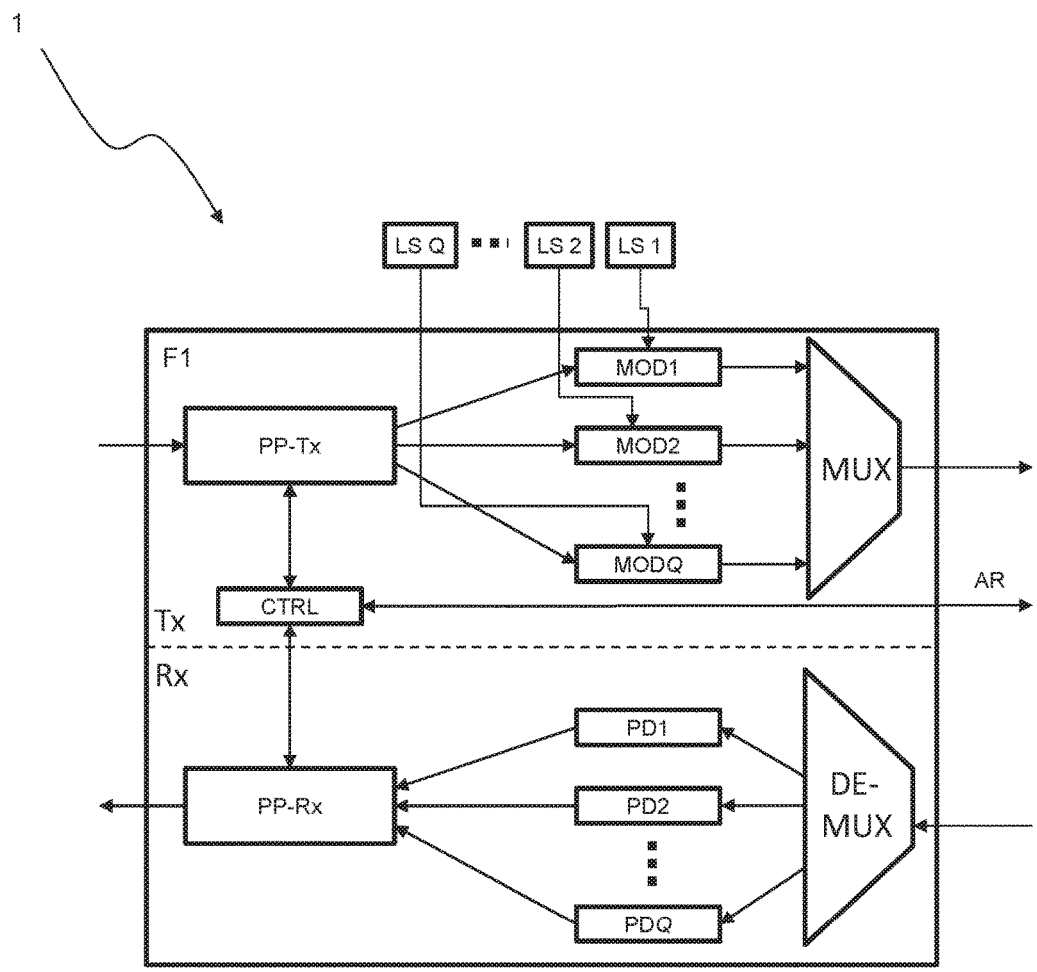
FIG. 3 is a schematic diagram showing the components of a fabric portion inside a switch module according to an embodiment of the first aspect of the invention.

FIG. 3 shows a more detailed view of the fabric side F1 of a typical switch module 1 which is used in the architecture of embodiments of the present invention. First, the structure of the switch module 1 will be described, followed by a description of the path of a signal through the switch module 1. Fabric side F1 is divided into two parts, a transmission side Tx and a receiving side Rx. Transmission side Tx includes a packet processor PP-Tx, an array of EAMs MOD1, MOD2 . . . MODQ, each of which receives an input from one of an array of light sources LS1, LS2 . . . LSQ. Each of the array of EAMs is connected to a single multiplexer WDM-MUX, which then outputs its WDM signal to an optical active switch, which can be thought of as "the fabric" which effects interconnection between all of the switch modules 1 of the optoelectronic switch of embodiments of the present invention. Receiving side Rx has a similar structure. More specifically, the receiving side Rx includes a packet processor PP-Rx, which receives inputs from an array of photodetectors PD1, PD2 . . . PDQ, which each receive input from a single demultiplexer WDM-DEMUX. The demultiplexer receives an input from the optical active switch (not shown in FIG. 3). A controller CTRL is also included in the switch module 1, and is not constrained to either the transmission side Tx or the receiving side Rx. The controller CTRL is connected bidirectionally to the two packet processors PP-Tx, PP-Rx and an arbiter, shown by the arrow labelled AR.

At a higher level, it is noted that all transfer of data occurring on the left-hand side of the drawing occurs in the electrical domain, and all data transfer occurring on the right-hand side of the drawing occurs in the optical domain, i.e. all data transfers taking place between the multiplexer WDM-MUX and the demultiplexer WDM-DEMUX.

Now, the journey of a packet through the various components of switch module 1 will be described. A packet contains information which is to be transmitted from a source switch module to a destination switch module. Specifically, the packet contains information relating to the intended destination switch module. In the following description of the journey taken by the packet, it is assumed that all data which is associated with that packet has the same intended destination switch module.

The following processes take place in the electrical domain. A packet may be incident on the transmission side Tx of the switch module 1 for example from a client portion which is connected to the client side of the switch module 1. Alternatively, the packet may be received from the receiving side Rx of switch module 1, (i.e. the same switch module) via the integrated switch shown e.g. in FIG. 2, so that said packet can be forwarded to another switch module (not shown), for transfer to a different dimension. This transfer of a packet between dimensions will be explained in greater depth later. The packet incident on transmission side Tx enters the transmission side packet processor PP-Tx, where it is sliced into a first plurality of Q electronic signals in the form of packet slices, each with the same destination switch module. The electrical (or "electronic") signals at the outputs of the transmission side packet processor PP-Tx, each of which includes a portion, or a "component", of the electronic signal received by the transmission side packet processor PP-Tx, may be referred to as "component signals" or "electronic component signals". Similarly, the electrical (or "electronic") signals received by the receiving side packet processor PP-Rx (and which are portions, or "components" that are combined, by the receiving side packet processor PP-Rx, to form an electronic signal at the output of the receiving side packet processor PP-Rx) may also be referred to as "component signals" or "electronic component signals". Each of the electrical signals is then transmitted to one of the Q EAMs MOD1, MOD2 . . . MODQ. At this point, each of the electrical signals contains information corresponding to the data in the packet slice and information relating to the destination switch module of the packet.

Consider now the packet slice which is incident on MOD1. MOD1 has two inputs (a) the electrical packet slice, and (b) light of a given wavelength $\lambda_1$ from a light source LS1. The optical channel is chosen to minimize cross-talk and to be relatively easy to manufacture the waveguides in good yield. Optical channel spacing of between 0.4 nm and 2 nm is preferable. The laser light would be of as narrow line width as practical for the application and is preferably no less than 1 KHz. In other configurations, the frequency resolution and spacing will depend on the finesse of the device, and hence the passive components. If there are e.g. 8 wavelengths, then the device may be quite "crude", but if more wavelengths are to be used, a higher specification will be required.

MOD1 then modulates the light from the light source LS1 to carry the information contained in the packet slice, to produce an optical signal with a given wavelength $\lambda_1$. From this point, data transfer is in the optical domain. Each modulator operates similarly to produce a first plurality of Q optical signals. The Q optical packet slices from each of the EAMs MOD1, MOD2 . . . MODQ are incident on the multiplexer MUX where wavelength-division multiplexing takes place to combine the Q optical signals (one from each EAM) into a single output optical fiber. Each of the Q optical signals has a different wavelength, and so crosstalk between signals is minimized. The multiplexed signal forming the multiplexed fabric output signal is then transmitted to an optical active switch (described in more detail later). The optical signals generated in switch module 1 are then transmitted by the optical active switch to their destination switch module or an intermediate switch module en route to the destination switch module. The control process, and associated hardware architecture, which ensures that each signal eventually arrives in the correct destination, will be described in more detail later.

For the purposes of this description, we will continue referring to FIG. 3, but in normal use, the source and destination switch modules would not be the same switch module. The source and destination modules may be the same module, however, e.g. for testing purposes. However, the source and destination switch modules are to be substantially identical to each other, so the description based on FIG. 3 still applies equally well. The optical multiplexed fabric input signal from the optical active switch is incident on demultiplexer DEMUX which is located on the receiving side Rx of the switch module 1. The multiplexed fabric input signal is demultiplexed by the demultiplexer DEMUX into a second plurality of Q optical signals which are equivalent to those combined at the multiplexer MUX on the source switch module 1. The Q demultiplexed signals are then incident on each of an array of photodetectors PD1, PD2 . . . PDQ. Therein, they are converted back into a second plurality of Q electrical signals, again containing the information which was contained in the original packet slices. The electrical signals are then transmitted to the packet processor PP-Rx, where, using information contained in the headers of the packet slices, they are recombined into the original packet which was incident on the packet processor PP-Tx of the source switch module 1.

In some embodiments each fabric portion on a given switch module 1 has its own associated multiplexer and demultiplexer.

Figure 4:
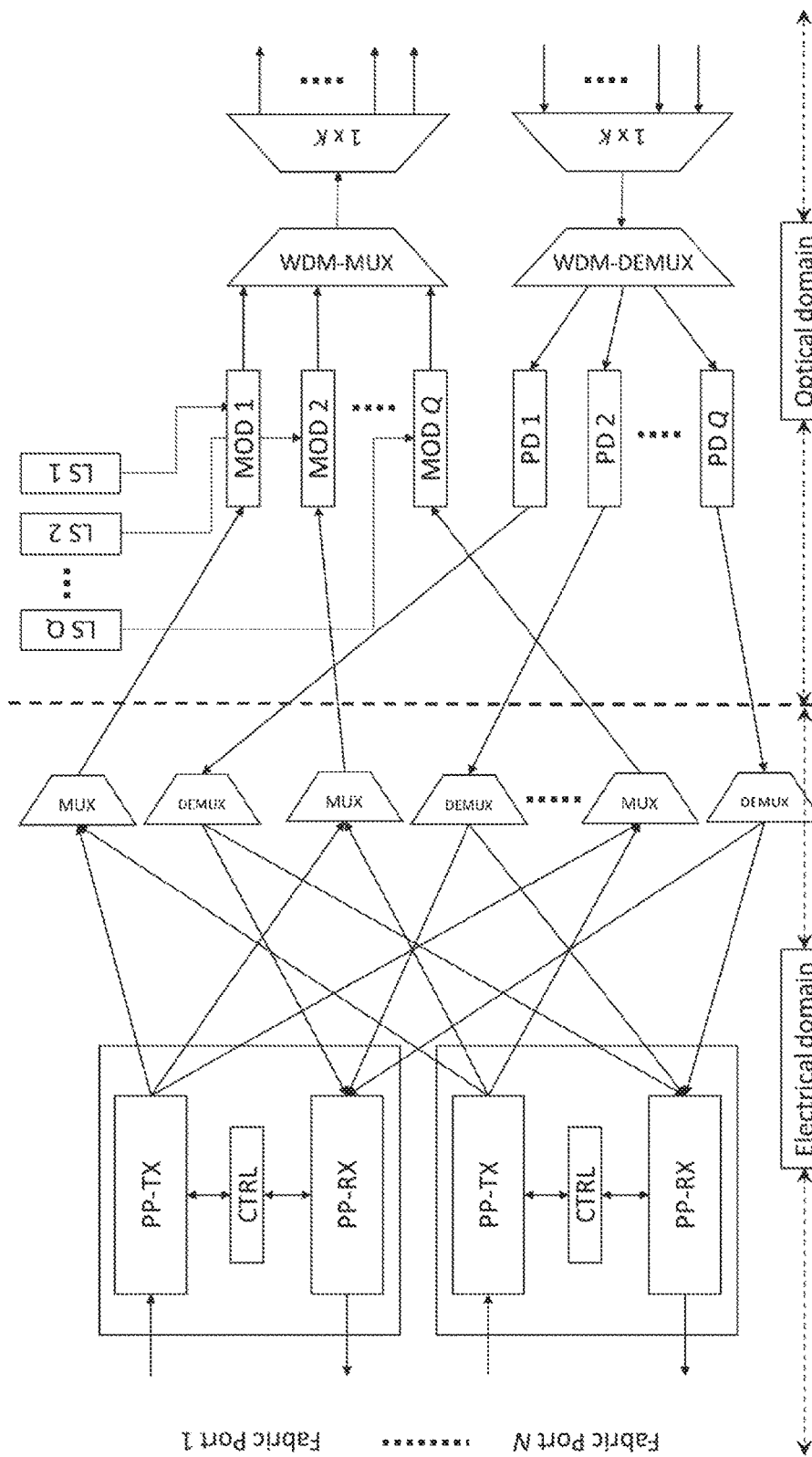
FIG. 4 is a schematic diagram showing the components of two different fabric portions of a switch module according to an alternative configuration.

However, in an alternative configuration, as shown in FIG. 4, it can be seen that this is not the case. In this case, the EAMs MOD1, MOD2 . . . MODQ (and their associated light sources), photodetectors PD1, PD2 . . . PDQ, multiplexers WDM-MUX and demultiplexers WDM-DEMUX are shared between N fabric ports. The drawing is divided into two sections to show which processes occur in the optical domain and which processes occur in the electrical domain. In this embodiment, there is an additional array of multiplexers and demultiplexers, shown to the left of the dotted line. In contrast to the multiplexers MUX located at the output of the EAMs MOD1, MOD2 . . . MODQ which are for wavelength-division multiplexing, the multiplexers to the left of the dotted line are configured to multiplex signals together in the electrical domain, rather than the optical domain. The same applies for the demultiplexers DEMUX. In another embodiment, the multiplexers and demultiplexers may be in the form of CMOS combinational logic circuits integrated into the switch modules. The journey of a packet from source switch module to destination switch module will now be described with reference to FIG. 4. Where processes or components are the same as in FIG. 3, description is not repeated here. A packet entering a first fabric portion passes through packet processor PP-Tx as before, where in this case it is divided into three packet fragments, each in the form of an electrical signal. Similarly, at the same time, a packet arriving at fabric portion F2 enters packet processor PP-Tx on a second fabric portion, and is also split into three packet fragments, again all in the form of an electrical signal. The three optical packet segments which are generated by the packet processor PP-Tx of each of the first and the second fabric portion are then sent off to three different multiplexers MUX. In other words, each of the multiplexers MUX receives two electrical signals, each corresponding to a packet fragment from a different packet, one which was incident on PP-Tx on the first fabric portion, and one which was incident on PP-Tx on the second fabric portion. These two signals are then multiplexed into a single multiplexed electronic signal, which is transmitted to one of the EAMs MOD1, MOD2 . . . MODQ. As in FIG. 3, the EAM modulates the signal from the light source LS1, LS2 . . . LSQ so that an optical signal is produced which carries the information previously carried by the electrical signal, each EAM MOD1, MOD2 . . . MODQ producing a signal with a different wavelength. Then, as in FIG. 3, the optical signals which are output from the EAMs MOD1, MOD2 . . . MODQ are wavelength-division multiplexed by multiplexer WDM-MUX into a single optical fiber. For every time slot in which a signal is sent, an arbitration step is necessary in order to determine which fabric portion is eligible to use the optical transmission path. Only one input to each multiplexer MUX can be active at any given time, to avoid losing data. Equivalently, on the reverse path, the demultiplexers DEMUX must be similarly controlled to send the incoming packet to the correct receiving fabric portion etc.

The 1×K additional optical multiplexers/demultiplexers are required in addition to the N×N optical active switches because in this configuration there is just one optical sender and receiver per switch module, which must be optically coupled to K different fibers (in both directions) for the different dimensions, so these multiplexers also need to be controlled appropriately to direct the signals correctly. For the demultiplexer DEMUX this means selecting the dimension along which to transmit. For the multiplexer WDM-MUX this implies that all the switch modules connected to this module need to be coordinated in such a manner that just one of the incoming optical fibers carries a valid signal in any given time slot. In order to achieve this, the configuration shown in FIG. 4 requires that arbiters be connected along all dimensions.

Again, as above, the signals are received by a different switch module from the one which sent the signals, but the receiving side Rx processes will be described with reference to the same drawing here for the sake of convenience and conciseness. The demultiplexer WDM-DEMUX demultiplexes the optical signals received from the 1×K demultiplexer into the same Q signals which entered the multiplexer WDM-MUX. One of the demultiplexed optical signals is then incident on each of the photodetectors PD1, PD2 . . . PDQ, which convert the optical signals back into a corresponding electrical signal. Each of the photodetectors PD1, PD2 . . . PDQ outputs the electrical signal to one of the three electrical domain demultiplexers DEMUX, for demultiplexing into its two constituent electrical signals, i.e. one originally from (in FIG. 4) the first fabric portion, and one originally from the second fabric portion. Each of the three electrical domain demultiplexers DEMUX outputs two signals, a packet fragment from the packet processor PP-Tx on each of the fabric portions. The three received packet fragments for each fabric portion are then combined on the packet processor PP-Rx on each fabric portion, to reproduce the original packets which were initially incident on the source switch modules. Thereafter, the packets may be transmitted to another fabric portion for transmission into another dimension or to a client portion for sending to an external device which is connected to the optoelectronic switch.

The configuration as shown in FIG. 4 requires time-division multiplexing as well as wavelength-division multiplexing, in order to grant access to each dimension to the fabric portions. This may be done using a strict time-division multiplexing regime i.e. running through successive fabric portions in sequence. Alternatively, the time-division multiplexing may be executed in a more flexible fashion—so long as only a single fabric portion is eligible to send signals at a given time slot. In an alternative, and more advanced configuration, it is possible to split up the available wavelengths and then have multiple fabric portions transmit simultaneously, but at different wavelengths. Then by using cyclic AWGs for the multiplexers WDM-MUX and demultiplexers WDM-DEMUX, more than one fabric portion may send along different dimensions at the same time, by using disjoint subsets of the available wavelengths.

Figure 5:
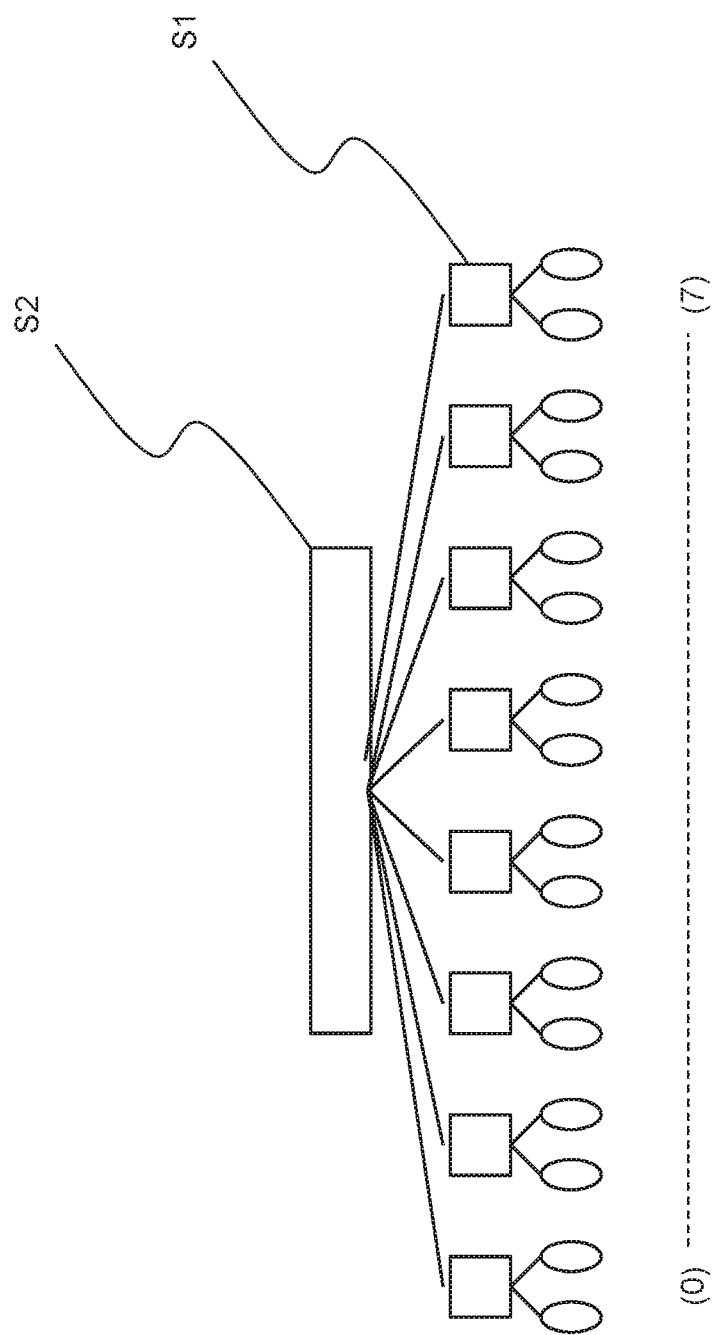
FIG. 5 is a schematic diagram of a one-dimensional switch which may be constructed using switch modules according to an embodiment of the invention.

FIG. 5 shows an example of a 1D optoelectronic switch. This demonstrates the basic connectivity of the optoelectronic switch architecture of embodiments of the present invention as well as the notation which may be used to conveniently describe more complicated, multidimensional optoelectronic switches.

Each of the small squares in the middle row of the drawing represents a single switch module as shown in e.g. FIGS. 3 and 4. The ellipses below these represent the client ports, which can be connected to external devices. As far as the description of the connectivity of the switch modules is concerned, the fabric portions and client portions are largely independent of each other and so they will not be discussed in the following description. The switch modules represent the smallest building blocks of the optoelectronic switch of some embodiments and are herein referred to as tier-0 switches. In the following description, tier-i switches, where i>0 are active switches which provide connections between switch modules (i.e. tier-0 switches), the connections being along the $i^{th}$ dimension, i.e. between switch modules which have identical co-ordinates other than their coordinate in the $i^{th}$ direction. Each of the tier-0 switches (labelled S1) is connected to the optical active switch represented by the long rectangle (labelled S2). This switch is referred to in this drawing as a tier-1 switch, and has 8 bidirectional inputs/outputs.

The following notation will be used to describe the arrays of tier-0 switches in the various configurations/architectures of embodiments of the present invention. The switch fabric as a whole may be described using the notation (N, R) where N is the number of tiers of optical switches in the switch architecture, which is equal to the number of dimensions, and R is a vector of the form $\{R_1, R_2 \ldots R_N\}$ giving the radix for each tier, which is the same as the "size" of the dimension as defined in the "Summary of the invention" section, where the radix gives the number of tier-0 switches to which each active (i.e. tier-i, where i>0) switch in tier-i is connected. More specifically, a tier is an array of active switches or switch modules. In the following description, tier-0 switches represent the switch modules (e.g. as shown in FIG. 3), and tier-i switches (where i>0) represent the active switches. A tier includes all of the switches which are associated with switching an optical signal within a given dimension, and hence there are N tiers in an N-dimensional switch. In this notation the optoelectronic switch shown in FIG. 5 can be described as a (N=1, R={8}) switch, since the highest tier switch is a tier-1 switch, and it is connected to all eight tier-0 switches. The number of switches $t_i$ in the $i^{th}$ tier is equal to the product of the radix of each dimension bar the $i^{th}$ dimension, i.e.

$$t_i = \prod_{j=1, j \neq i}^{j=N} L_j.$$

In other words, $t_i$ is equal to the product of the terms in the vector R which don't refer to the $i^{th}$ dimension.

Each individual optical switch can be labelled thus: S(i;C), where i represents the tier in which the switch is situated, e.g. tier-0, tier-1 etc. C is a vector having (N−1) entries, corresponding to the position of the tier-i switch within its tier, in a coordinate system of the radices of the tiers except the tier to which the switch corresponds. For example, in a tier-3 network, the switches in tier-2 have C=$(c_1, c_3)$ where $c_1$ and $c_3$ represent labels for the switches with their tier.

Figure 6:
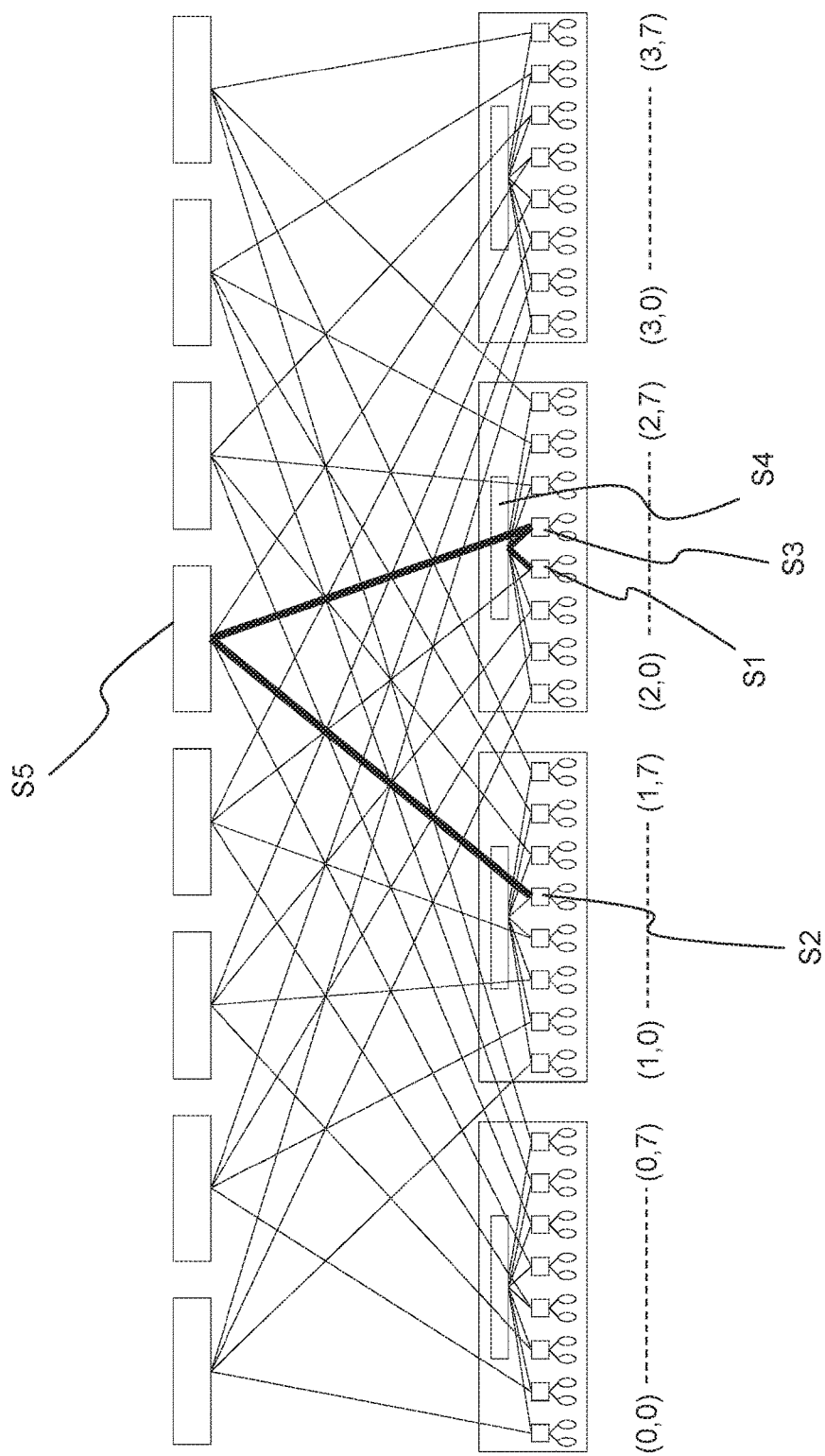
FIG. 6 is a schematic diagram of a two-dimensional switch, according to an embodiment of the second aspect of the invention, and which may be constructed using switch modules according to an embodiment of the first aspect of the invention.

FIG. 6 shows a schematic example of a 2D optoelectronic switch classified as (N=2, R={8,4}) according to the notation above. There are 32 (i.e. 8×4) tier-0 switches connected together in this particular embodiment. Each of the 32 tier-0 switches has two fabric ports, one for connecting to a switch in tier-1 and one for connecting to a switch in tier-2. Because the 32 tier-0 switches are organized into 4 sets of 8, there are 4 tier-1 switches and 8 tier-2 switches. This drawing demonstrates clearly an important property of optoelectronic switches according to embodiments of the present invention, namely that the maximum number of optical hops required to get from one tier-0 switch to any other tier-0 switch is the number of tiers (i.e. N) in the switch architecture. For example, consider the transmission of data from the switch labelled S1 to the switch labelled S2, wherein the hops are shown with thicker lines. First of all, the data is transferred from switch S1 to switch S3, via switch S4. Then, in a second hop, the data is transferred from switch S3 to switch S2, via switch S5. Thus, it can be seen that in switches according to embodiments of the present invention, data can be transferred in a series of optical hops, each time via a tier-i switch in a different tier.

More specifically, at each stage, the packet is transferred from one tier-0 switch to another as described with reference to FIG. 3 above, and then before the next optical hop can occur it may be necessary for the packet to be transferred via an electronic hop within the tier-0 switch itself; however, the electronic hop does not significantly slow the operation, since the electronic data transfers experience lower latency, the integrated switch has a lower associated radix, and there is no time of flight consideration required. Furthermore, since the transfer is simply from one fabric portion to another fabric portion within the same tier-0 switch, there is also no need for any external arbitration or control.

Figure 7:
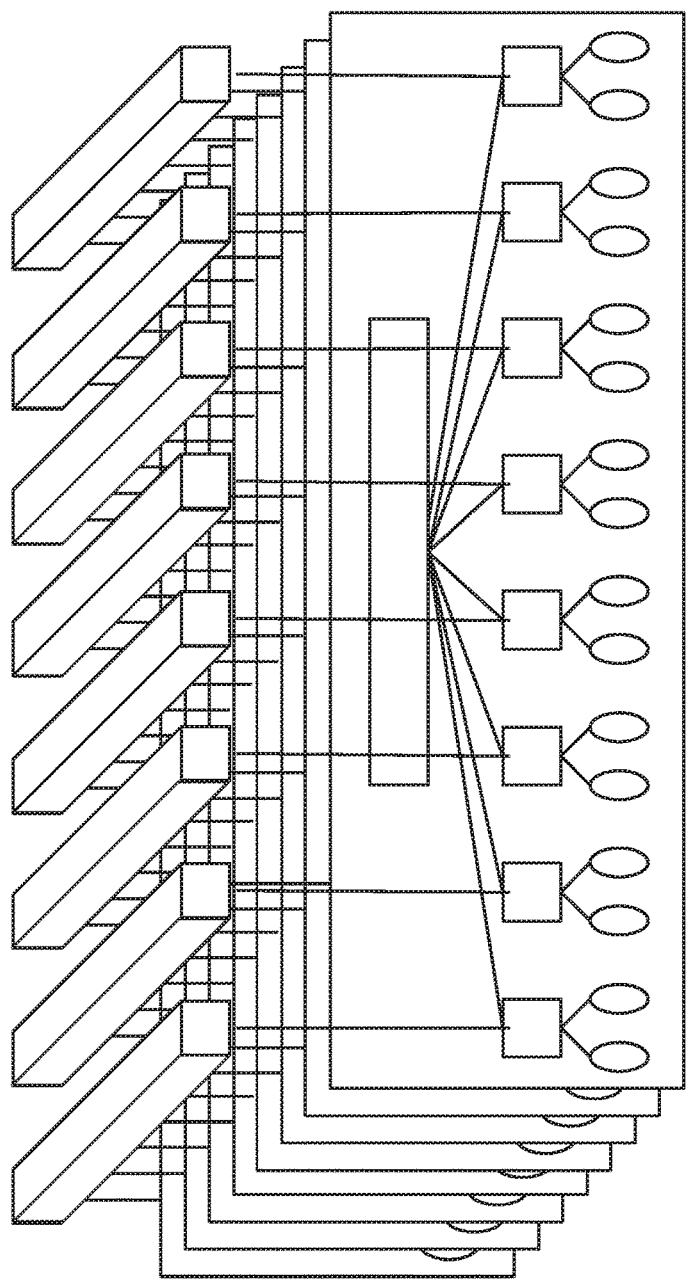
FIG. 7 is a schematic diagram of an alternative layout of a two-dimensional switch, according to another embodiment of the second aspect of the invention, and which may be constructed using switch modules according to an embodiment of the first aspect of the invention.
Figure 8:
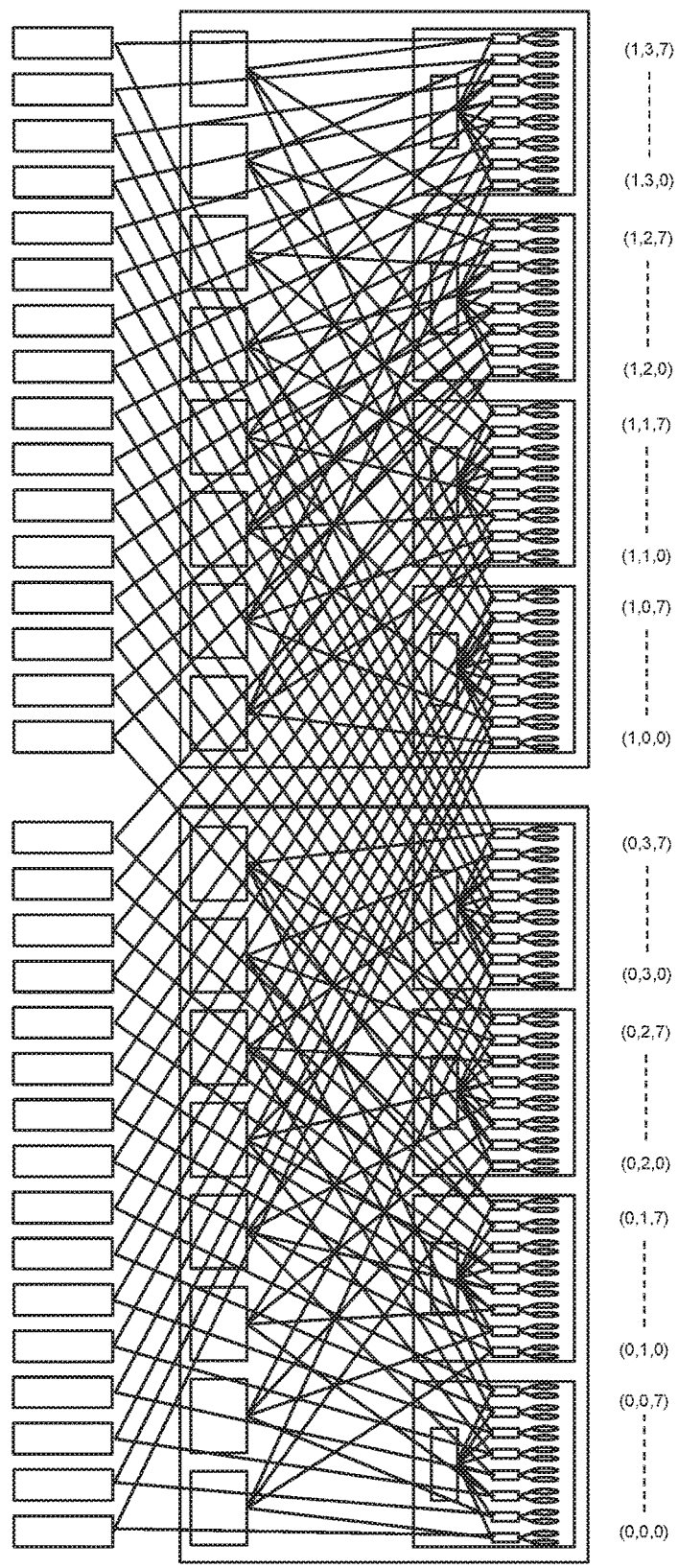
FIG. 8 is a schematic diagram of a three-dimensional switch, according to another embodiment of the second aspect of the invention, and which may be constructed using switch modules according to an embodiment of the first aspect of the invention.

FIG. 7 shows an alternative schematic of a 2D optoelectronic switch, this time with (N=2, R={8,8}). This switch has identical properties to the switch shown in FIG. 6. This switch also illustrates more clearly the interrelation between the tier-i switches and the tier-0 switches. In particular, it can be seen that the tier-0 switches are arranged in an 8×8 array, with a tier-1 switch associated with each row, and a tier-2 switch associated with each column. More specifically, since each tier-0 switch has a fabric portion associated with each of the tiers, it can be seen that a tier-i (i≠0) switch provides a route between a given tier-0 switch, and every other tier-0 switch which has identical coordinates in all tiers except for tier i. (where a coordinate within tier i is a value ranging from 0 to $t_i-1$, $t_i$ being the number of active switches in tier i). This point can be seen also from FIG. 8 which shows a 3D optoelectronic switch having (N=3, R={8,4,2}). Here, it is possible to get from any tier-0 switch to any other tier-0 switch in a maximum of 3 optical hops, each via a different tier-i (i≠0) switch. It can be seen that the 3D optoelectronic switch of FIG. 8 is formed by placing two of the 2D switches shown in FIG. 6 side-by-side and introducing an array of 32 tier-3 switches to provide the required interconnectivity. 32 tier-3 switches are required since a tier-3 switch is required for each set of tier-0 switches having the same coordinate in both tier-1 and tier-2. Since there are effectively 2 groups each consisting of 8×4 tier-0 switches, it can be seen that 32 tier-3 switches are necessary, each connecting to one tier-0 switch in the first group and one tier-0 switch in the second group. Hence, the tier-3 switches shown in FIG. 8 each have two connections. More simply put, the number of switches in each tier-i (i≠0) is equal to the product of the radices of each of the other tiers-i (i≠0).

Figure 9A:
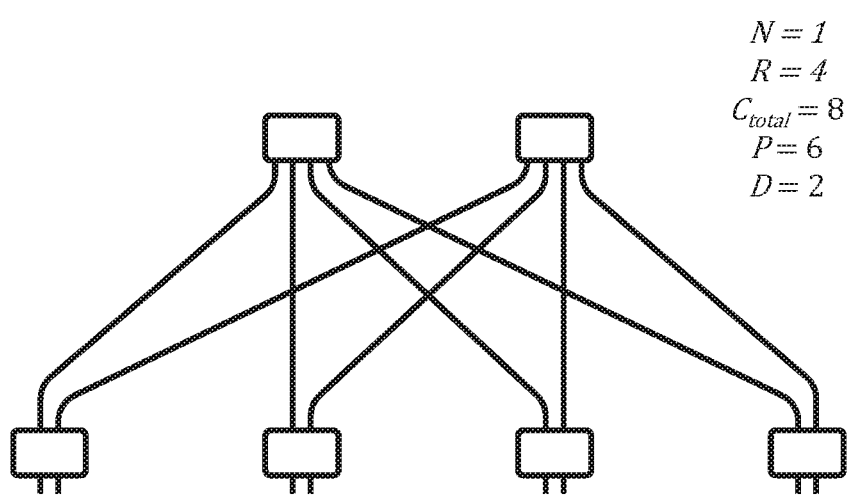
FIGS. 9A-C are schematic diagrams showing further examples of switch architectures according to the second aspect of the invention, in which all active switches have the same number of inputs/outputs.
Figure 9B:
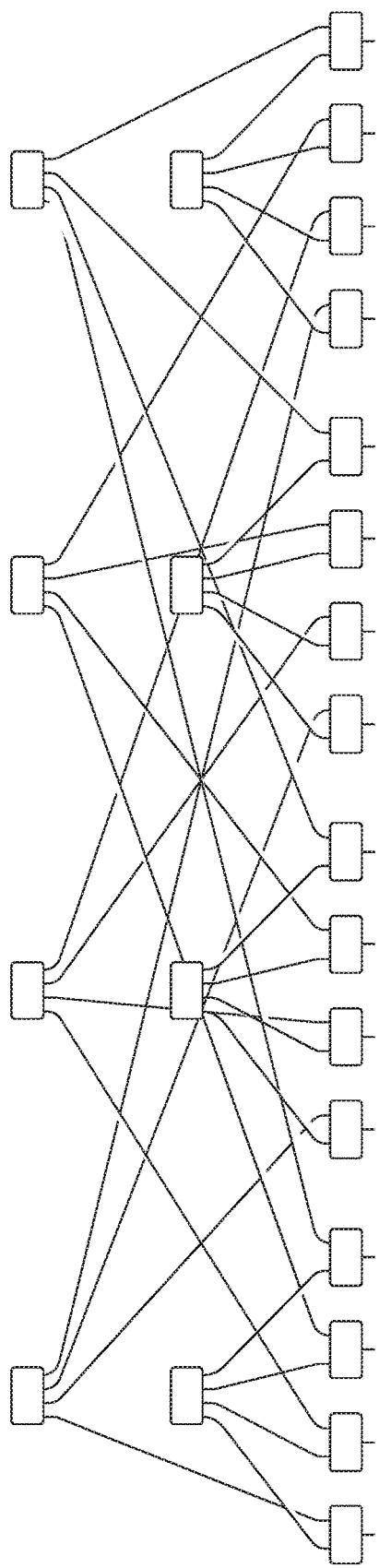
Figure 9C:
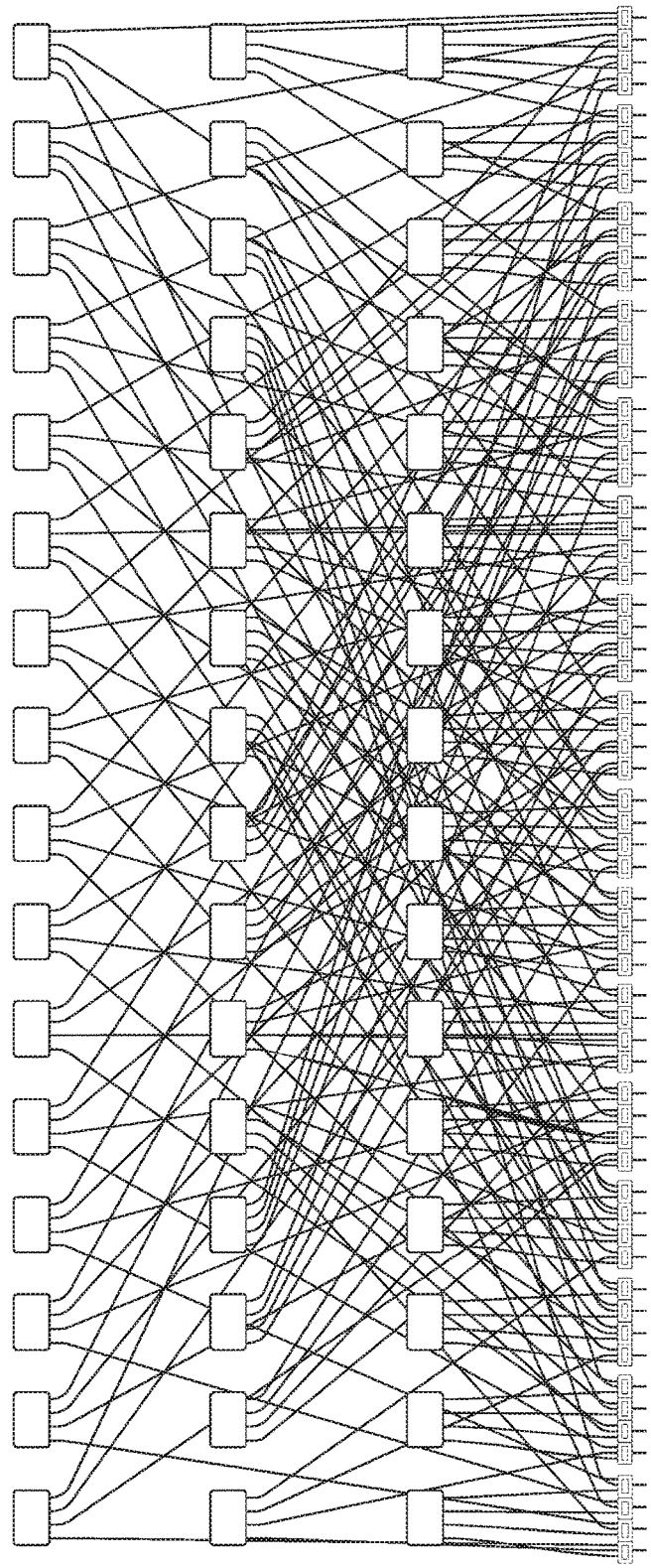

FIGS. 9A-C show further arrangements of optoelectronic switches according to embodiments of the present invention. In these examples, all of the active switches have the same radix, referred to here as R. In the notation above, this is represented as R={R, R, R}={4, 4, 4}.

Figure 11:
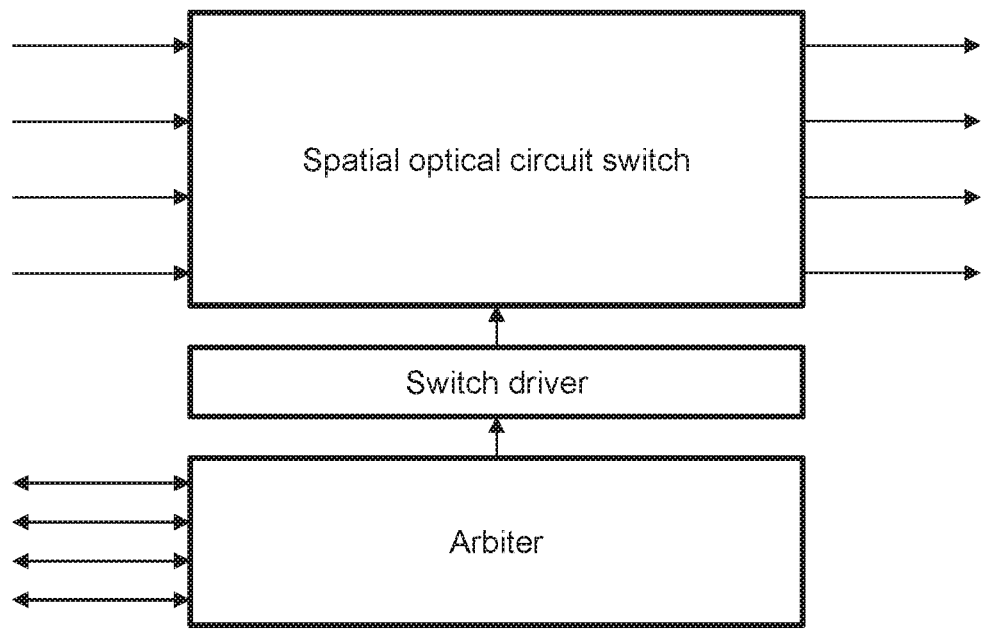
FIG. 11 is a schematic diagram illustrating the connections between the arbiters and the spatial optical switches according to an embodiment of the invention.

In order for the tier-i (i≠0) switches to operate correctly, and to send optical signals to the correct destination tier-0 switch, they must be controlled by an arbiter. FIG. 11 shows a schematic diagram of how the arbiter is connected to the tier-i (i≠0) optical active switches. The inputs to the arbiter are connected to the controller CTRL as shown in FIGS. 3 and 4, for example. These controllers CTRL receive input from the packet processors e.g. PP-Tx and PP-Rx relating to the intended destinations of the packets which are incident upon them. This information is then relayed to the arbiter, which calculates the optimal scheme of operation for the tier-i (i≠0) optical active switches, in order for all of the signals to reach the correct destination tier-0 switch, i.e. to provide data transfer routes such that each transmission side of a fabric portion is paired with the correct receiving side of a fabric portion, to provide non-blocking operation. This calculated scheme of operation is then transmitted to the switch driver which drives and controls the operation of the tier-i (i≠0) optical active switches, in order to effect efficient switching of the optical signals which are received at its inputs.

Figure 10:
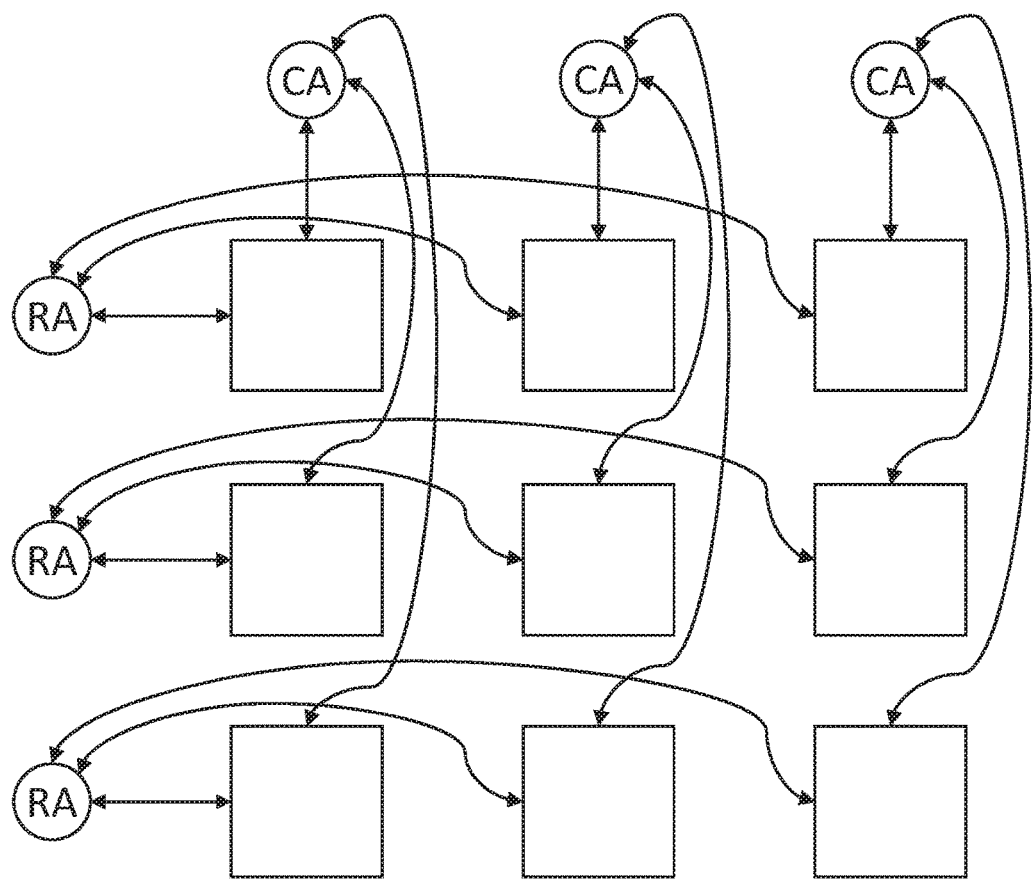
FIG. 10 is a schematic diagram illustrating the way in which arbiters may be connected to switch modules arranged according to a second aspect of the invention.

FIG. 10 illustrates the connections between the tier-0 switches and the arbiters, in an exemplar 3×3 optoelectronic switch. Much like the tier-i (i≠0) optical active switches, there is an arbiter associated with every sub-array of tier-0 switches which have the same coordinate in all tiers except for one. In the 2D case, i.e. a case where there are only two tiers, this means that each row is associated with a row arbiter RA, and each column is associated with a column arbiter CA. Thus, data transfer between tier-0 switches which are in the same row can be controlled by the relevant row arbiter RA, and then subsequent optical hops between rows (via tier-i (i≠0) optical active switches) can be controlled by the relevant column arbiter CA. As explained elsewhere in this applications the switches may be connected using optical or electronic switches. Where electronic switches such as shared memory switches are used there may be no need for separate arbiters as illustrated in this FIG. 10.

Figure 12:
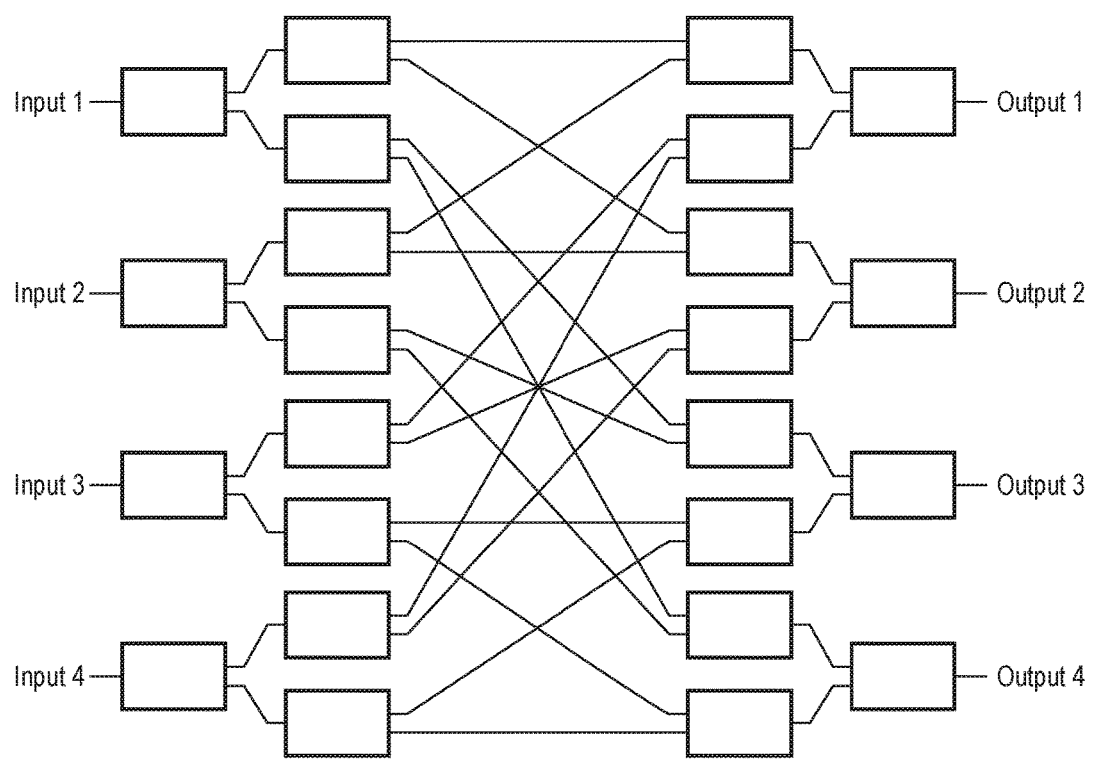
FIG. 12 shows an example setup of a Mach-Zehnder switch which may be used as a spatial optical switch as part of a switch array according to an embodiment of the second aspect of the invention.

FIG. 12 shows an example of the setup of MZIs inside an optical MZI cascade switch which may be used as an optical active switch in embodiments of the present invention. The solid rectangles denote the individual MZIs. Using the notation of the "Summary of the Invention" system, it can be seen that in this particular configuration, the MZI cascade switch has $R_i=4=2^2$ (i.e. n=2) inputs and outputs. The input side may be made up of four 1×4 "trees" (one of which is highlighted in the dashed box), each of which includes two stages of 1×2 MZIs. The output side has a mirror image arrangement. The inner two layers of 1×2 MZIs are connected so that a route can be provided from all inputs to all outputs simultaneously, in a non-blocking fashion. In other words, each of the 4!=24 combinations of input-output which are possible between four inputs and four outputs are accommodated by this MZI cascade switch. The switch driver, e.g. as shown in FIG. 11, is configured to control which of the 24 combinations is to be taken, by controlling the voltage applied across the electro-optic region of each 1×2 MZI.

Figure 13A:
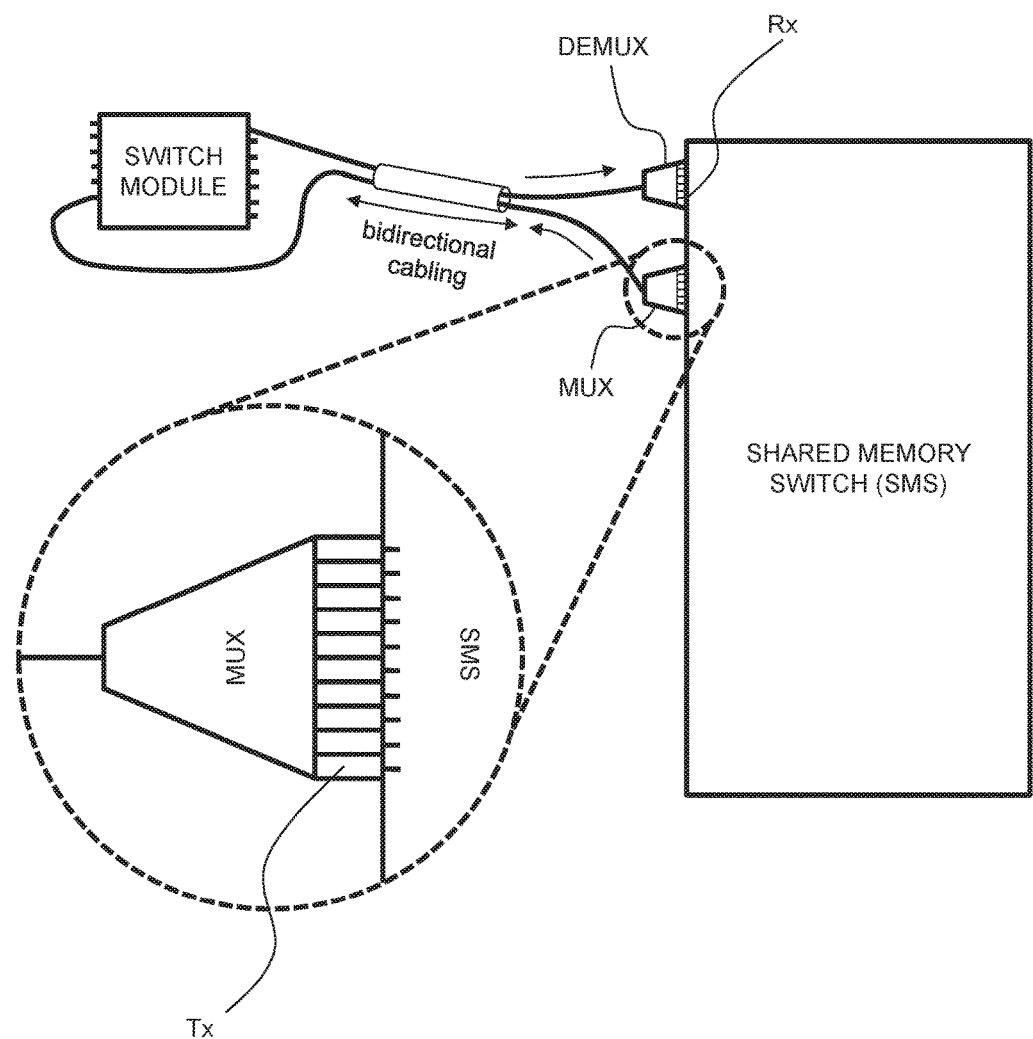
FIGS. 13 A-C show examples of embodiments of the present invention wherein an electronic active switch, or a plurality of electronic active switches are used, rather than an optical active switch.

FIG. 13A shows an arrangement of components to be employed when an electronic active switch is used instead of an optical active switch, as shown in FIG. 12. For simplicity, only one switch module is shown. The bidirectional link shown conveys the multiplexed fabric output signals towards the (electronic) shared memory switch SMS. At the SMS, the signals are incident upon a demultiplexer DEMUX, configured to split the multiplexed signals into a plurality of optical signals. The DEMUX has essentially the same structure as the MUX (shown in an enlarged view), only in reverse. The equivalents to the modules labelled "Rx" or "Tx" on the DEMUX act as optical to electronic (O/E) converters for converting the optical signals into a plurality of electronic signals which are then switched to the correct output by the SMS. Then the modules "Rx" or "Tx" act as electronic to optical (E/O) converters to convert the switch electronic signals to optical signals which are then multiplexed to form a multiplexed fabric input signal. This signal is then conveyed to the correct switch module by an optical (WDM) fiber.

Figure 13B:
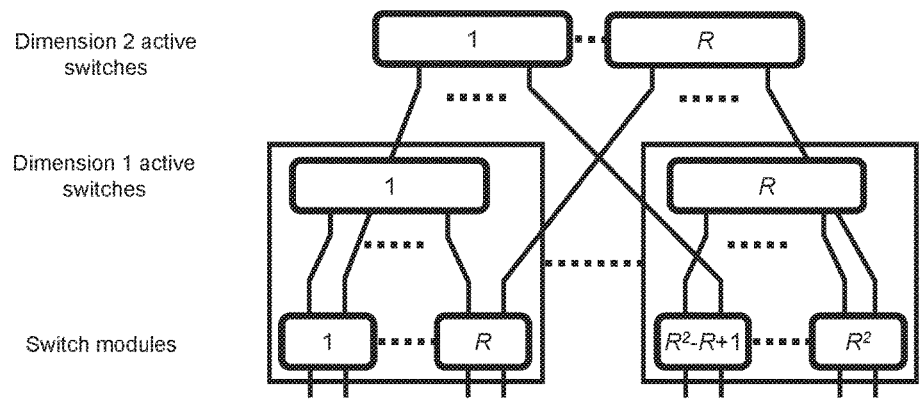
Figure 13C:
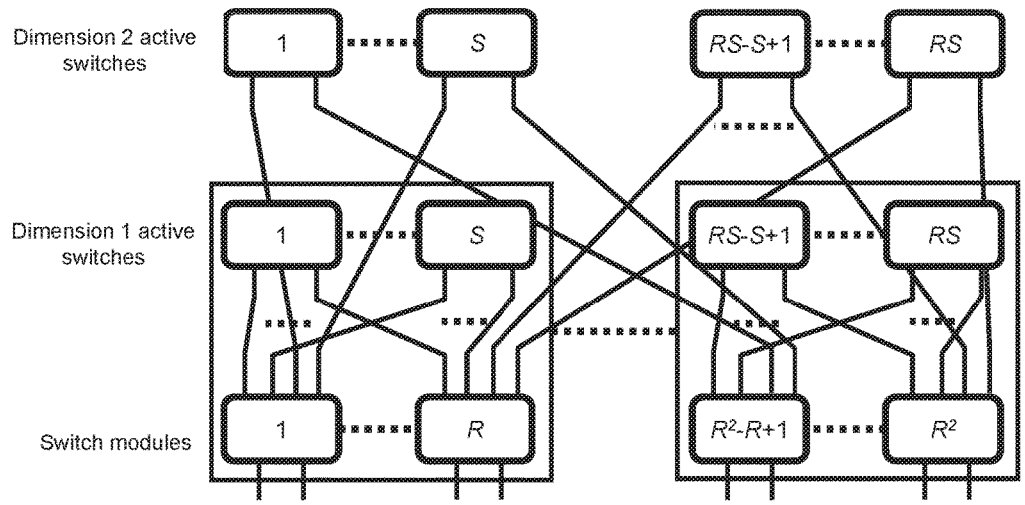

FIG. 13C shows a similar setup to that in FIGS. 13A and 13B, in which, rather than a single electronic active switch being used to connect the switch modules which are located in each sub-array of switch modules, a plurality or band of electronic active switches are used. It is noted that it is also possible to use a band of optical active switches, e.g. of the type described in the preceding paragraphs. Topologically, these two approaches are the same, and for conciseness, only an embodiment employing electronic active switches is described in detail. Using a plurality of switches to interconnect the switch modules in each sub-array results in a greater bisection bandwidth. This is best appreciated from a comparison between FIGS. 13B and 13C, which are drawn using similar layouts. In these examples, there are R sets of R switch modules, which can for example be thought of as a square array having R columns and R rows, (the switch modules being labelled 1 to $R^2$). In this particular case, the sub-arrays are:

Dimension 1: each of the R sets, containing R switch modules, and

Dimension 2: the sets of switch modules having the same position within each of the R sets.

In the arrangement shown in FIG. 13B, a single electronic active switch is used to connect all of the switch modules in a given sub-array, as is also illustrated for example in FIG. 9B. However, in an alternative embodiment, as is shown in FIG. 13C, rather than a single electronic active switch being used to interconnect the sub-arrays, an array of S electronic active switches is used instead. In the embodiment shown, the connections between the switch modules in a given sub-array, via the electronic active switches are in the form of a Clos network, and more specifically, a folded Clos network since the links are bidirectional. However, other network topologies may be used to interconnect each sub-array. In this embodiment, there are S electronic active switches within each band. Preferably, S is chosen to be equal to the number of client ports on each of the switch modules.

Although exemplary embodiments of a switch module and optoelectronic switch have been specifically described and illustrated herein, many modifications and variations will be apparent to those skilled in the art. Accordingly, it is to be understood that a switch module or optoelectronic switch constructed according to principles of this invention may be embodied other than as specifically described herein. The invention is also defined in the following claims, and equivalents thereof.

What is claimed is:

1. A switch module, for use in an optoelectronic switch, the switch module having:
   a client portion for connecting to an input device or an output device; and
   a first fabric portion having a transmission side and a receiving side,
   the transmission side having:
      a transmission side input;
      a transmission side packet processor configured to receive, at the transmission side input, a first electronic signal, and to produce, at a plurality of outputs of the transmission side packet processor, a plurality of respective first electronic component signals;
      a plurality of transmission side electrical to optical converters for converting each of the first electronic component signals into a respective optical signal of a first plurality of optical signals;
      a transmission side multiplexer for converting the first plurality of optical signals into a multiplexed fabric output signal, and
   the receiving side having:
      a receiving side demultiplexer for receiving a multiplexed fabric input signal and separating said multiplexed fabric input signal into a second plurality of optical signals;

a plurality of receiving side optical to electrical converters for converting each of the second plurality of optical signals into a respective second electronic component signal of a plurality of respective second electronic component signals;
a receiving side output; and
a receiving side packet processor configured to receive, at respective inputs of the receiving side packet processor, the second electronic component signals, and to transmit, at the receiving side output, a second electronic signal,
the switch module further comprising:
a second fabric portion having:
a transmission side; and
a receiving side,
the receiving side having:
a receiving side demultiplexer for receiving a multiplexed fabric input signal and separating said multiplexed fabric input signal into a third plurality of optical signals;
a plurality of receiving side optical to electrical converters for converting each of the third plurality of optical signals into a respective third electronic component signal of a plurality of respective third electronic component signals;
a receiving side output; and
a receiving side packet processor configured to receive, at respective inputs of the receiving side packet processor, the third electronic component signals, and to transmit, at the receiving side output, a third electronic signal; and
an integrated switch connected to:
the client portion;
the transmission side input of the first fabric portion; and
the receiving side output of the second fabric portion,
the integrated switch being configured to route the first electronic signal to the transmission side input of the first fabric portion from either:
an output of the client portion; or
the receiving side output of the second fabric portion.

2. The switch module of claim 1, wherein the transmission side packet processor is configured:
to receive the first electronic signal in the form of an original packet having a packet header, the packet header containing destination information identifying a destination switch module for the packet; and
to perform packet fragmentation wherein:
packets of data having the same destination switch module are arranged into frames having a predetermined size; and
a packet of data is split into a plurality of packet fragments arranged in a corresponding plurality of frames, and
wherein the receiving side packet processor is configured to recreate the original packet from the packet fragments, when said packet is spread over more than one frame.

3. The switch module of claim 2, wherein the switch module is configured to send the multiplexed fabric output signal in a series of successive bursts, each burst including packets and/or packet fragments from a single frame, such that each burst includes only packets and/or packet fragments having the same destination switch module, and pairs of sequential bursts being separated by a time interval.

4. The switch module of claim 1, wherein:
each of the electrical to optical converters is a modulator; and
the transmission side packet processor is configured to perform packet slicing, wherein a frame or packet is sliced to form the first plurality of electronic component signals.

5. The switch module of claim 4, wherein each of the optical to electrical converters is a photodetector.

6. The switch module of claim 1, wherein the transmission side packet processor and/or the receiving side packet processor is/are connected to a controller, for connection to an arbiter.

7. The switch module of claim 6, wherein the transmission side packet processor is configured to send a request to the arbiter, the request identifying a destination switch module of a packet.

8. The switch module of claim 7, wherein the transmission side packet processor is configured to look up which output, of an active switch to which it is connected, corresponds to the destination switch module identified by the request.

9. The switch module of claim 1, wherein either or both of the transmission side multiplexer and the receiving side demultiplexer is an arrayed waveguide grating (AWG).

10. The switch module of claim 1, further comprising means for connecting to an optical backplane.

11. An N-dimensional optoelectronic switch for transferring an optical signal from an input device to an output device, the optoelectronic switch comprising a plurality of switch modules, the switch modules being interconnected, wherein:
each switch module has:
a client portion for connecting to an input device or an output device; and
a first fabric portion having a transmission side and a receiving side,
the transmission side having:
a transmission side input;
a transmission side packet processor configured to receive, at the transmission side input, a first electronic signal, and to produce, at a plurality of outputs of the transmission side packet processor, a plurality of respective first electronic component signals;
a plurality of transmission side electrical to optical converters for converting each of the first electronic component signals into a respective optical signal of a first plurality of optical signals;
a transmission side multiplexer for converting the first plurality of optical signals into a multiplexed fabric output signal, and
the receiving side having:
a receiving side demultiplexer for receiving a multiplexed fabric input signal and separating said multiplexed fabric input signal into a second plurality of optical signals;
a plurality of receiving side optical to electrical converters for converting each of the second plurality of optical signals into a respective second electronic component signal of a plurality of respective second electronic component signals;
a receiving side output; and
a receiving side packet processor configured to receive, at respective inputs of the receiving side packet processor, the second electronic component signals, and to transmit, at the receiving side output, a second electronic signal;

the switch modules are arranged in an N-dimensional array having a size $R_i$ in the $i^{th}$ dimension of the N dimensions of the array, each switch module having an associated set of coordinates giving its location with respect to each of the N dimensions;

each switch module is a member of N sub-arrays, each sub-array comprising $R_i$ switch modules whose coordinates differ only in respect of their location in the $i^{th}$ dimension, and each of the N sub-arrays being associated with a different dimension;

each sub-array further includes an active switch having $R_i$ inputs and $R_i$ outputs;

each input of each active switch is configured to receive a multiplexed fabric output signal from a respective one of the $R_i$ switch modules in the sub-array; and the active switch is configured to direct a multiplexed fabric output signal from any of its $R_i$ inputs to any one of the $R_i$ outputs, based on destination information contained in the first electronic signal received by the transmission side input of a fabric portion of the switch module from which the active switch received the multiplexed fabric output signal.

12. The optoelectronic switch of claim 11, wherein each switch module has at least N fabric portions, each of the N fabric portions being associated with a different sub-array of which the switch module is a member.

13. The optoelectronic switch of claim 11, wherein the active switches are located on and connected to an optical backplane, the optical backplane further including a plurality of optical links for providing connections between each switch module and each active switch with which said switch module shares a sub-array.

14. The optoelectronic switch of claim 11, wherein the active switches are optical active switches or electronic active switches.

15. The optoelectronic switch of claim 14, wherein the active switch is a Mach-Zehnder interferometer (MZI) cascade switch, comprising a plurality of MZIs, each MZI having two arms which split at an input coupler, with two arms feeding split paths into an output coupler where they are recombined, and two output portions, the plurality of MZIs being arranged to provide a pathway from each input to each output of the MZI cascade switch.

16. The optoelectronic switch of claim 14, wherein each electronic active switch further includes:
  an optical-to-electrical converter at each input for converting the multiplexed fabric output signal from an optical signal to an electronic active switching signal; and
  an electrical-to-optical converter at each output for converting the electronic active switching signal to an optical signal in the form of the multiplexed fabric input signal,
  wherein the electronic active switch is configured to switch the electronic active switching signal from any of its $R_i$ inputs to any of its $R_i$ outputs, and
  wherein:
    the optical-to-electrical converter includes a demultiplexer for demultiplexing the multiplexed fabric output signal into a first plurality of intermediate optical signals, and a corresponding plurality of photodetectors for converting each of the intermediate optical signals into an intermediate electronic active switching signal for switching to a desired output, and
    the electrical-to-optical converter is configured to convert the plurality of switched intermediate electronic active switching signals into a second plurality of intermediate optical signals, and further includes a multiplexer for multiplexing said second plurality of intermediate optical signals to form the multiplexed fabric input signal.

17. The optoelectronic switch of claim 11, where each sub-array of switch modules also includes an arbiter, the arbiter configured to control operation of the active switch included in the sub-array, based on destination information stored in packets of data to be switched.

18. The optoelectronic switch of claim 17, wherein the arbiter is connected to at least one of a transmission side packet processor and a receiving side packet processor on every switch module in the sub-array, and is configured to receive a request from each of the transmission side packet processors to which it is connected.

19. An N-dimensional optoelectronic switch for transferring an optical signal from an input device to an output device, the optoelectronic switch comprising a plurality of switch modules, the switch modules being interconnected, wherein:
  each switch module has:
    a client portion for connecting to an input device or an output device; and
    a first fabric portion having a transmission side and a receiving side,
    the transmission side having:
      a transmission side input;
      a transmission side packet processor configured to receive, at the transmission side input, a first electronic signal, and to produce, at a plurality of outputs of the transmission side packet processor, a plurality of respective first electronic component signals;
      a plurality of transmission side electrical to optical converters for converting each of the first electronic component signals into a respective optical signal of a first plurality of optical signals;
      a transmission side multiplexer for converting the first plurality of optical signals into a multiplexed fabric output signal, and
    the receiving side having:
      a receiving side demultiplexer for receiving a multiplexed fabric input signal and separating said multiplexed fabric input signal into a second plurality of optical signals;
      a plurality of receiving side optical to electrical converters for converting each of the second plurality of optical signals into a respective second electronic component signal of a plurality of respective second electronic component signals;
      a receiving side output; and
      a receiving side packet processor configured to receive, at respective inputs of the receiving side packet processor, the second electronic component signals, and to transmit, at the receiving side output, a second electronic signal;
  the switch modules are arranged in an N-dimensional array having a size $R_i$ in the $i^{th}$ dimension of the N dimensions of the array, each switch module having an associated set of coordinates giving its location with respect to each of the N dimensions;
  each switch module is a member of N sub-arrays $S_i$, each sub-array comprising $R_i$ switch modules whose coordinates differ only in respect of their location in the $i^{th}$ dimension, and each of the N sub-arrays being associated with a different dimension;

each sub-array further includes one or more active switches, arranged to provide connections between all of the switch modules in that sub-array;

an input of each active switch is configured to receive a multiplexed fabric output from one of the $R_i$ switch modules in the sub-array; and each of the one or more active switches is configured to direct a multiplexed fabric output signal from any switch module in the sub-array to any other switch module in the sub-array, based on destination information contained in the first electronic signal received by the transmission side input of a fabric portion of the switch module from which the active switch received the multiplexed fabric output signal.

20. The optoelectronic switch of claim 19, wherein a sub-array of $R_i$ switch modules includes only a single active switch having $R_i$ inputs and $R_i$ outputs, and:

each input of the active switch is configured to receive a multiplexed fabric output signal from a respective one of the $R_i$ switch modules in the sub-array, each of the switch modules is configured to receive a multiplexed fabric output signal from one of the $R_i$ outputs of the active switch, and the active switch is configured to direct a multiplexed fabric output signal from any of its $R_i$ inputs to any one of the $R_i$ outputs, based on the destination information contained in the first electronic signal received at the transmission side input of the switch module from which the active switch received the multiplexed fabric output signal.

21. The optoelectronic switch of claim 20, wherein at least one sub-array of $R_i$ switch modules includes $P_{sub}$ active switches, $P_{sub}$ being an integer greater than 1, arranged to form a network connecting each switch module in the sub-array with each other switch module in the sub-array.

22. The optoelectronic switch of claim 21, wherein the network is any one of a: Clos network, a Clos-like network and a folded Clos network.

23. The optoelectronic switch of claim 21 wherein:

the value of $P_{sub}$ is the same for all sub-arrays which include a plurality of active switches, and/or all of the switch modules of the at least one sub-array of $R_i$ switch modules have the same number of client ports, and the value of $P_{sub}$ is equal to the number of client ports on each of the switch modules.

* * * * *